United States Patent
Getzschman et al.

(10) Patent No.: US 11,021,046 B2
(45) Date of Patent: Jun. 1, 2021

(54) RETRACTABLE OVERHEAD SHADE

(71) Applicant: Bestop, Inc., Louisville, CO (US)

(72) Inventors: Eric D. Getzschman, New Baltimore, MI (US); William H. Haberkamp, Rochester Hills, MI (US); Michael Beltowski, Firestone, CO (US)

(73) Assignee: Bestop, Inc., Louisville, CO (US)

( * ) Notice: Subject to any disclaimer, the term of this patent is extended or adjusted under 35 U.S.C. 154(b) by 266 days.

(21) Appl. No.: 16/084,871

(22) PCT Filed: Mar. 14, 2017

(86) PCT No.: PCT/US2017/022307
§ 371 (c)(1),
(2) Date: Sep. 13, 2018

(87) PCT Pub. No.: WO2017/160841
PCT Pub. Date: Sep. 21, 2017

(65) Prior Publication Data
US 2019/0054806 A1    Feb. 21, 2019

Related U.S. Application Data

(60) Provisional application No. 62/307,939, filed on Mar. 14, 2016.

(51) Int. Cl.
*B60J 7/00* (2006.01)
*B60J 7/06* (2006.01)
(Continued)

(52) U.S. Cl.
CPC .......... *B60J 7/0015* (2013.01); *B60J 1/2038* (2013.01); *B60J 1/2044* (2013.01); *B60J 1/2047* (2013.01);
(Continued)

(58) Field of Classification Search
CPC ........ B60J 7/0015; B60J 1/2069; B60J 7/068; B60J 1/2038; B60J 1/2044; B60J 1/2047; B60J 7/067; B60J 7/1858; B60J 7/20
(Continued)

(56) References Cited

U.S. PATENT DOCUMENTS 2,094,932 A  * 10/1937  Hargreaves .............. B60J 1/205
                                                         160/28
4,828,319 A  *  5/1989  Benson .................... B60J 11/02
                                                         160/23.1
(Continued)

FOREIGN PATENT DOCUMENTS

DE    102010018735 A1    11/2011
WO       2015179859 A1    11/2015

OTHER PUBLICATIONS

International Search Report for International Application No. PCT/US2017/022307, dated May 30, 2017.

*Primary Examiner* — Joseph D. Pape
(74) *Attorney, Agent, or Firm* — Warn Partners, P.C.

(57) ABSTRACT

A retractable overhead assembly for a vehicle having a retractable cover (912) under tension and an integrated stiffening rod that includes attachment features (916) to selectively connect to a windshield area. The retractable system is self contained within an extrusion keeping the overall package size small and the installation/removal simple. The retractable cover creates a sun shade over the vehicle front cockpit and/or rear passenger area when deployed, and is retractable to a stowed position. The retractable overhead assembly is installable under any hard or soft top assembly configuration, and does not impede use or operation of the hard top or soft top assembly.

19 Claims, 16 Drawing Sheets

(51) Int. Cl.
*B60J 7/20* (2006.01)
*B60J 7/185* (2006.01)
*B60J 1/20* (2006.01)

(52) U.S. Cl.
CPC ............ *B60J 1/2069* (2013.01); *B60J 7/067* (2013.01); *B60J 7/068* (2013.01); *B60J 7/1858* (2013.01); *B60J 7/20* (2013.01); *B60Y 2200/141* (2013.01)

(58) Field of Classification Search
USPC .................................................. 296/216.01
See application file for complete search history.

(56) References Cited

U.S. PATENT DOCUMENTS

| | | | |
|---|---|---|---|
| 5,762,393 A | 6/1998 | Darmas, Sr. | |
| 6,851,739 B2* | 2/2005 | Morley | B60J 1/08 280/756 |
| 8,302,655 B2 | 11/2012 | Lin | |
| 2001/0054833 A1* | 12/2001 | Wingen | B60J 7/0015 296/214 |
| 2005/0134096 A1* | 6/2005 | Fallis, III | B60J 7/10 296/218 |
| 2005/0257903 A1 | 11/2005 | Schimko et al. | |
| 2007/0175603 A1* | 8/2007 | Lin | E06B 9/42 160/273.1 |
| 2012/0180961 A1 | 7/2012 | Lin | |

* cited by examiner

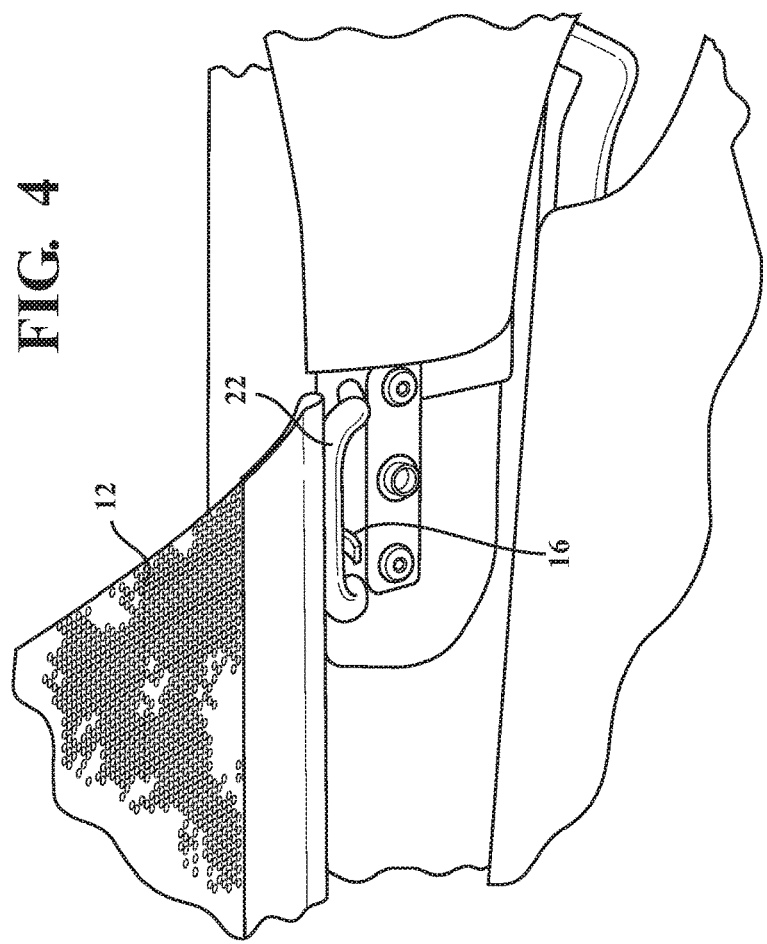
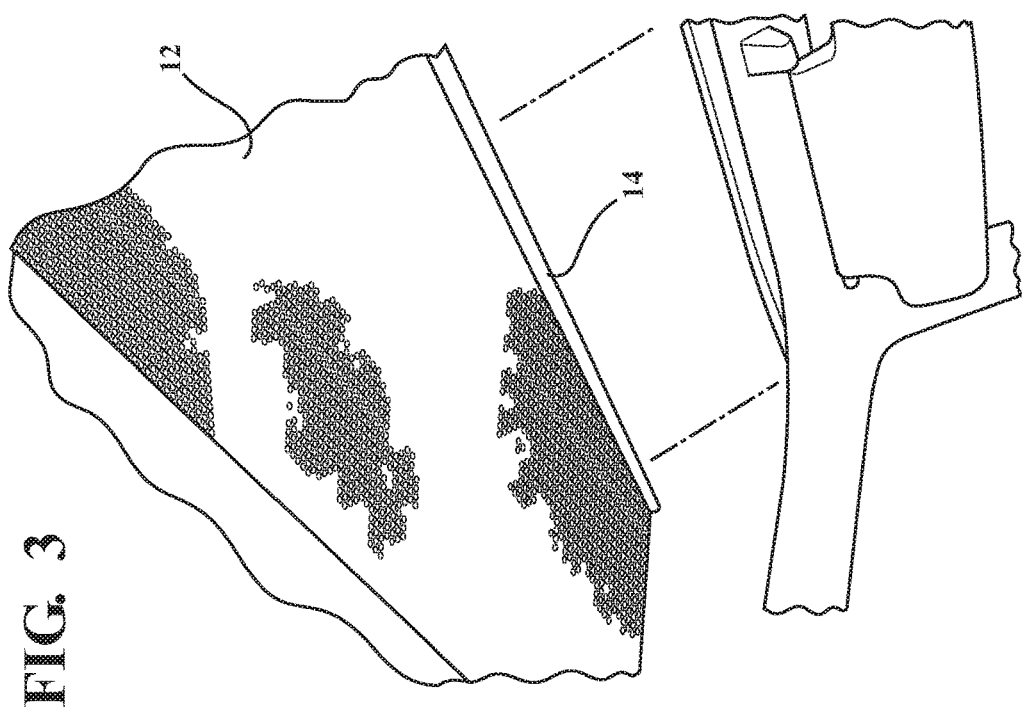

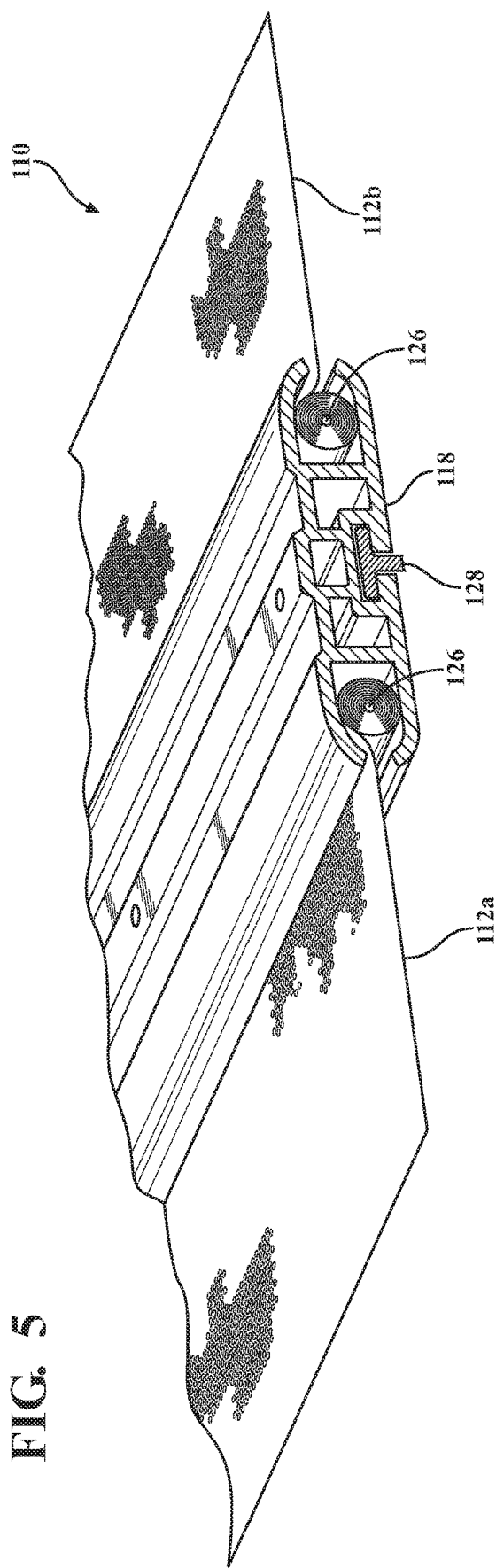
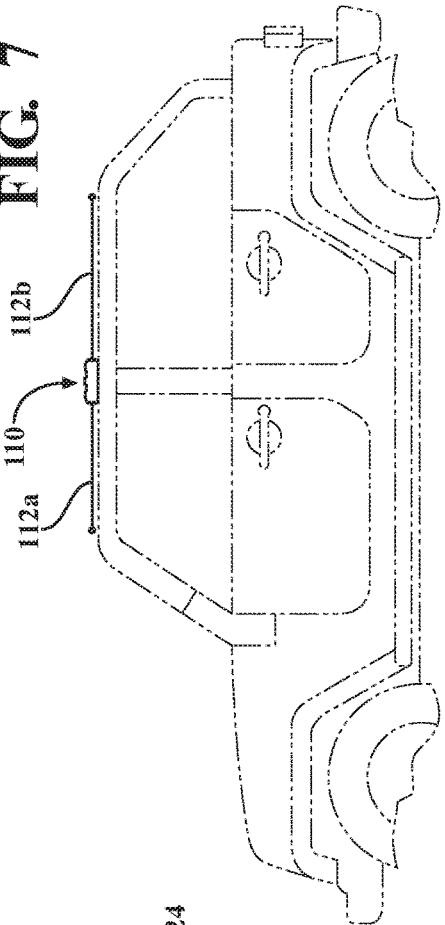
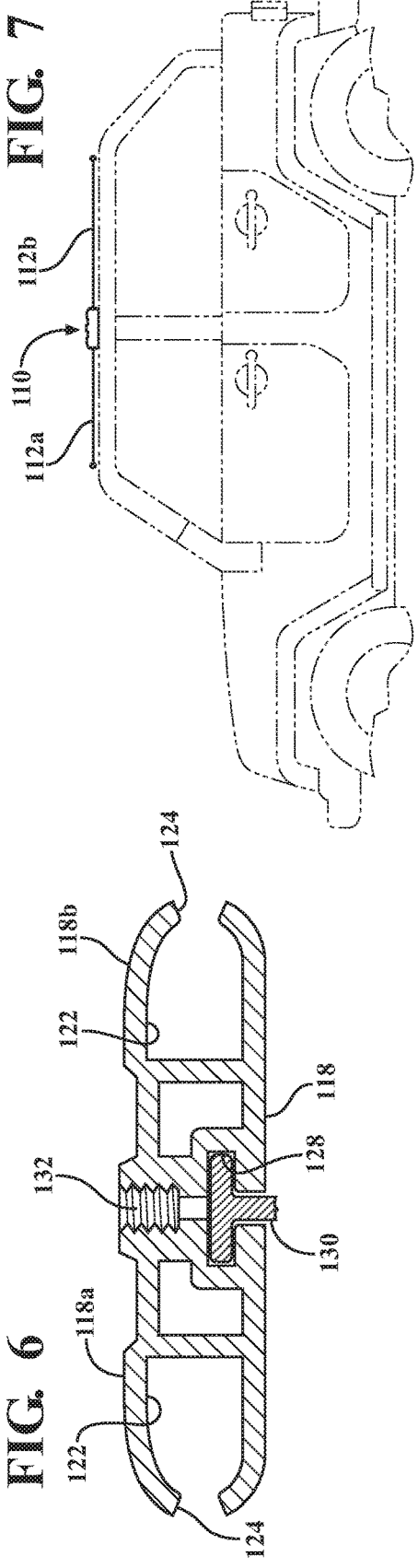

FIG. 17
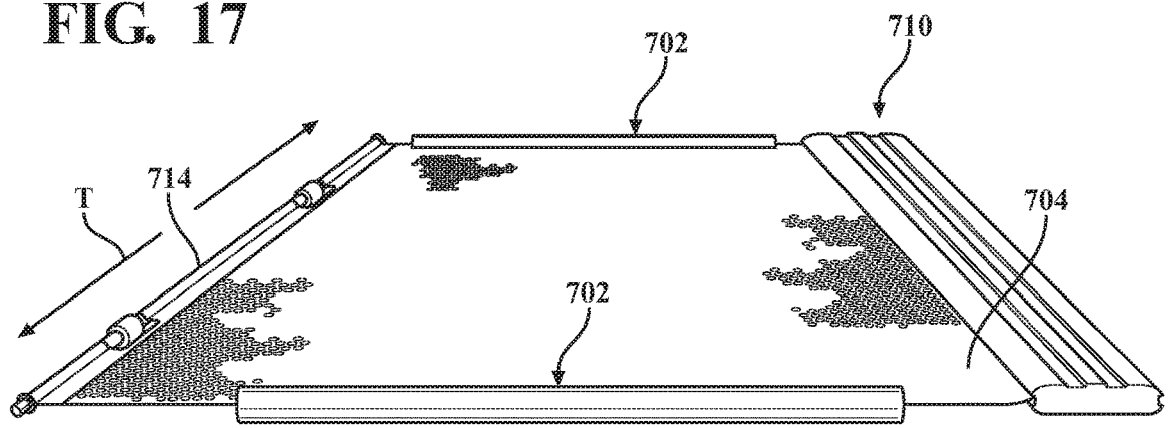
FIG. 17A
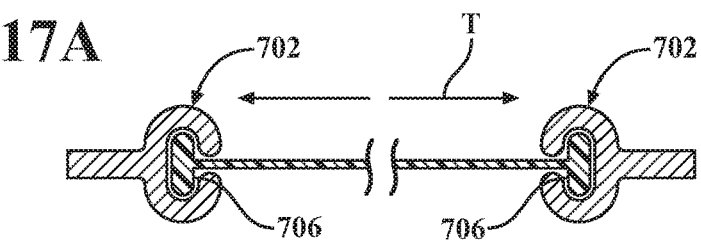
FIG. 17B
FIG. 17C
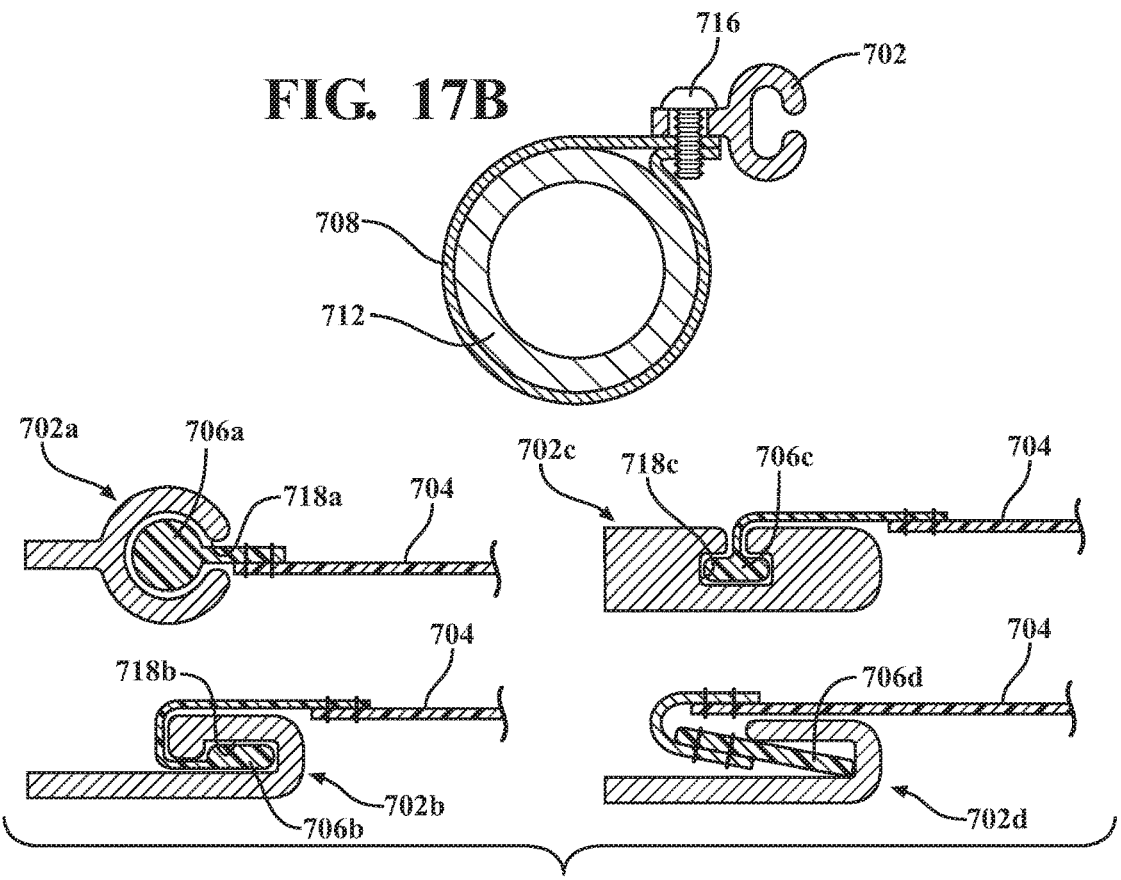

RETRACTABLE OVERHEAD SHADE

CROSS-REFERENCE TO RELATED APPLICATIONS

This application claims the benefit of U.S. Provisional Application No. 62/307,939, filed Mar. 14, 2016. The disclosure of the above application is incorporated herein by reference.

FIELD OF THE INVENTION

The present invention relates to an overhead weather shade system for front cockpit areas and/or rear passenger areas of vehicles.

BACKGROUND OF THE INVENTION

Roof soft top and hard top assemblies are commonly used in two-door and four-door sport-utility vehicles. The soft top and hard top roof assemblies cover the cockpit to protect the occupants of the vehicle from various weather conditions. However, there are occasions where the weather is pleasant, and it is desired by the occupant of the vehicle to move the soft top roof assembly to an open position, or remove one or more hard top roof panels from the vehicle, such that the vehicle essentially functions without part of a roof, and the cockpit driver/passenger compartment of the vehicle is exposed to the atmosphere. This provides an open air feel and allows the occupants of the vehicle to enjoy more favorable weather conditions while driving.

However, when the top is folded back or cockpit panel(s) is/are removed this allows wind and sunlight to enter the cabin of the vehicle.

There are times when a vehicle occupant desires to have this open air feel but with a diffusion of wind and sun in the cockpit to reduce wind noise and sun rays. Fabric covers can be added to help diffuse wind and block the sun. Typical fabric covers used to cover the top of the driver/passenger use a series of bungee cord-like fasteners to attach the fabric cover to the sport bars. Additional cords attach the fabric cover to the windshield area, e.g., to a windshield header. One of the disadvantages of typical fabric covers is the headroom due to fabric is centerline of the sport bar. Another of the disadvantages is the fabric cover leaves gaps along the front, both sides, and the rear of the cover and therefore does not cover the area over the driver/passenger compartment efficiently.

Another known cover assembly having a top or cover is provided where one or more installed windshield channel or windshield header features retain or otherwise connect to the front edge area of a fabric cover, and is/are secured to the windshield frame, e.g., the cover assembly and channels utilize securing features such as latches, threaded knobs, screws, straps, etc. By way of example, windshield channel (s) must be installed to the windshield frame, and the cover assembly attached thereto. Typically, the sides and rear of the fabric cover are also connected to the vehicle. While this cover assembly provides superior coverage essentially of the cockpit compartment compared to the aforementioned problematic fabric cover, there remains a desire to have the ability to fasten the fabric to the windshield area without using a windshield channel or windshield header. The costs are not reduced because a windshield channel is needed, which are typically metal stamped windshield channels, and/or windshield header also adding to vehicle weight and requiring installation.

Another common problem with conventional assemblies is that if some level of protection is desired the user must install an additional unit at that time. The installed unit also does not allow for the hard or soft top to be used to the full extent, e.g., open air, until the unit is removed. Thus, if a completely open air feel is desired, the entire unit must be removed. Installation is also difficult for many vehicle users having a hard or soft top on the vehicle since installation is complex, or, with some owners, infeasible. There is also no quick and easy system available that allows for a stowed position while the system is still installed in the vehicle.

Accordingly, there exists a need for an overhead shade system that provides a positional shade that generally covers the cockpit area and/or rear passenger area when in use, operably retracts to a stowed position, and maximizes vehicle packaging efficiency to allow the shade assembly to remain on the vehicle with the hard or soft top system without interfering with the hard or soft top system.

SUMMARY OF THE INVENTION

The present invention is directed to a retractable overhead cover assembly including one or more attachment features, and a retractable shade that is self contained within a housing mountable to a vehicle, e.g., SUV. The retractable overhead cover assembly provides for maximum vehicle packaging efficiency so that original equipment manufacturer (OEM) hard top or soft top roof assemblies are left on the vehicle with the retractable overhead cover assembly, and can be utilized alone or in combination with the retractable overhead cover assembly. When a completely open air feel is desired, both the hard or soft top assembly and the retractable shade are positioned to a stowed (or open) position, or any desired intermediate or partially stowed position(s). When a more defused open air position is desired, e.g., to reduce wind, wind noise, ultraviolet rays, and debris into the cockpit, the retractable shade is positioned to a deployed (or closed) position, or any desired intermediate or partially stowed position(s). Regardless of whether the retractable shade is in the stowed/open positions, the hard or soft top assembly does not need to be removed and can continue to be used by the vehicle owner as desired. Another one of the advantages of the retractable shade is that an operator can remain in the vehicle while simply and easily disconnecting the retractable shade from the front and allowing it to retract back to the stowed position when desired.

In another embodiment, the retractable overhead cover assembly is operably modified/applied to cover the rear passenger compartment. In yet another embodiment, the one or more retractable overhead cover assemblies cover the cockpit and rear passenger compartments. In another embodiment, the retractable shade has two or more panels, each respective panel covering the driver, front passenger area, rear passenger area(s) and/or cargo areas.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a bottom rear perspective view of the retractable shade of FIG. 1 being deployed toward a closed position, in accordance with the present invention, FIG. 4 is a bottom rear perspective view from within the vehicle cockpit depicting the retractable shade connected to the vehicle in the closed position, in accordance with an embodiment of the present invention;

FIG. 5 is a perspective view schematic of a retractable overhead cover assembly that has a housing for a dual shade, in accordance with another embodiment of the present invention;

FIG. 6 is a side elevation of the housing of FIG. 5 illustrating an attachment method to connect the housing to the vehicle of the present invention;

FIG. 7 is a side elevation of a vehicle having the dual shade of FIGS. 5-6 center mounted to the vehicle, in accordance with the present invention;

FIG. 17 is a top perspective view of a retractable overhead cover assembly incorporated with a side rail fabric management system for tensioning a retractable shade, according to an embodiment of the present invention;

FIG. 17A is a rear elevation of FIG. 17 illustrating the direction of tension held, cross car;

FIG. 17B is a rear elevation of the side rail of FIG. 17 shown mounted to a sport bar without drilling, according to an embodiment of the present invention;

FIG. 17C are rear elevation views depicting exemplary side rails and attachment methods for selectively attaching the side rail to the vehicle, according to additional embodiments of the present invention;

DETAILED DESCRIPTION OF THE PREFERRED EMBODIMENTS

Figure 1:
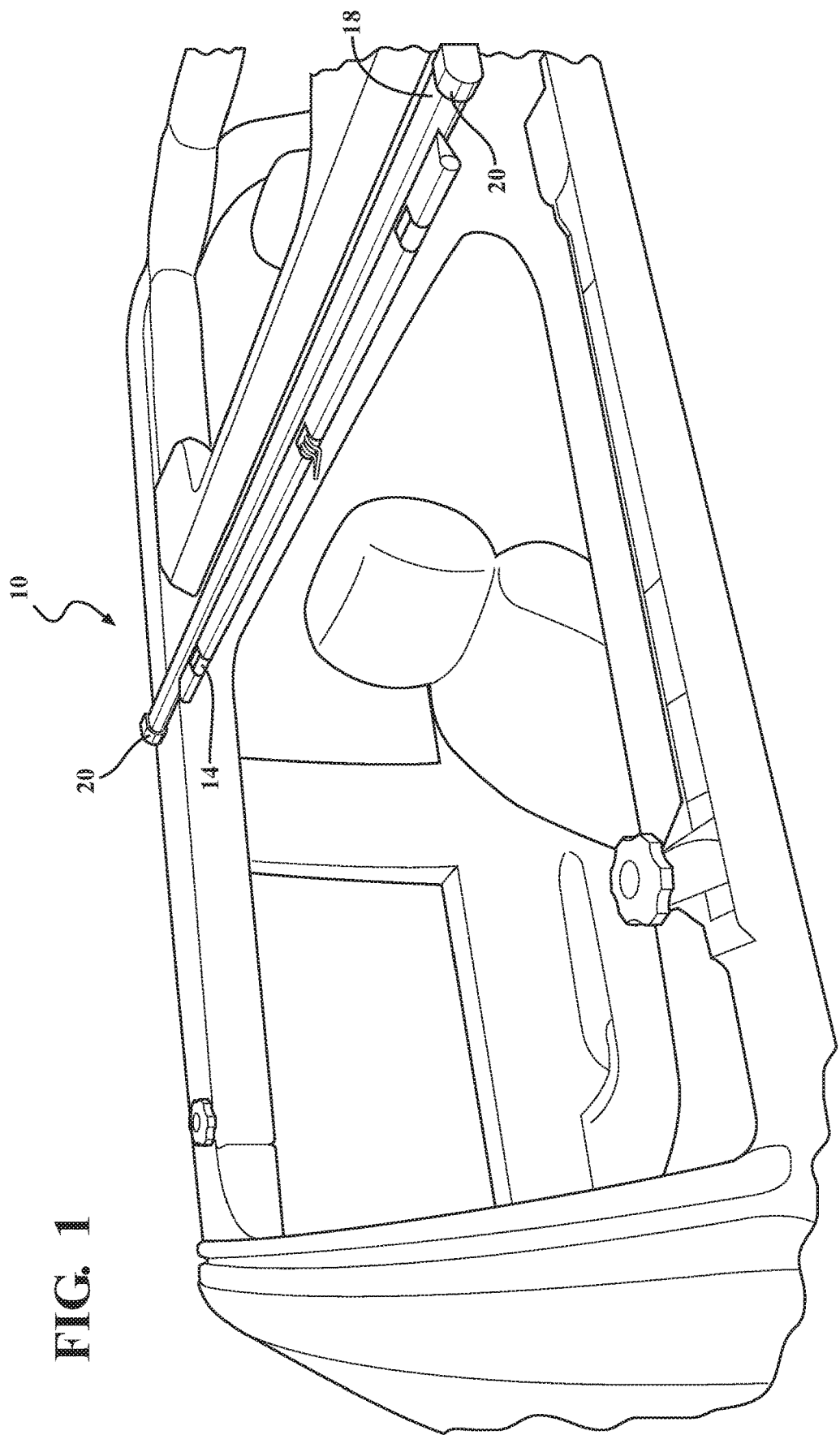
FIG. 1 is a top perspective view of a retractable overhead cover assembly according to the present invention mounted to an area near a vehicle sport bar, where a retractable shade is in a stowed position.

The following description of the preferred embodiment(s) is merely exemplary in nature and is in no way intended to limit the invention, its application, or uses.

Referring to the figures generally, the present invention provides an easily installable/removable unit mountable in any of a plurality of predetermined locations under any hard or soft top assembly, and provides the ability to easily fasten a retractable shade to the interior windshield area when desired and/or other predetermined vehicle attachment points depending on the application. The retractable shade creates a retractable sun screen or soft top liner. In a most preferred embodiment, the entire unit remains installed under any hard top roof assembly or soft top roof assembly of any type of vehicle, which eliminates the need to remove the hard or soft top assembly to use either. The retractable shade is also under tension and is easily retracted to a stowed position when desired, such that an operator can remain in the vehicle while simply and easily disconnecting the retractable shade and allowing it to retract automatically to the stowed position. The present invention also eliminates the need for metal stamp windshield channels, latches, knobs, etc, which is a significant benefit over conventional systems. A stiffening rod provides structure for the shade and attachment features operably coupled thereto to connect to the upper windshield area and/or other vehicle attachment location(s).

The retractable shade is a netting or mesh material (e.g., woven or knitted mesh, plastic mesh, fabric, or any other suitable shade material for diffusing, etc) to provide an overhead shade that substantially covers the top of the cockpit area, rear passenger area, and/or cargo area, and/or of the entire vehicle interior occupant and/or cargo compartments. When any front and/or rearward section of the soft top or hard top assembly is folded back, removed or otherwise stowed to provide an open air feel, the retractable shade remains, which when deployed, provides shade from the sun, as well as wind and particulate diffusion.

Referring to FIGS. 1-16 generally, and more particularly to FIGS. 1-4, in accordance with the present invention there is provided a retractable overhead shade assembly shown generally at 10 having a retractable shade 12 operably connected to an attachment rod (or "stiffening rod" or "reinforcement bar") 14 (e.g., within sewn pocket or any other suitably method of attachment). At least one, most preferably, a plurality of attachment features 16 are operably connected to the attachment rod. In a preferred embodiment, the attachment features 16 are hooks, where each hook connects to a respective one of vehicle attachment points, preferably, to footman loops along the upper windshield frame area. The retractable shade moves between a deployed position and stowed position (any number of intermediate positions is contemplated without departing from the scope of the invention), and, in the deployed position, is held in place by the attachment rod 14 at the front by hooking to the vehicle.

At least one tensioning mechanism is provided in cooperation with the retractable shade 12 and a housing 18 (e.g., an aluminum extrusion, or any suitable housing and/or material, etc). The retractable shade 12 system is self contained within the aluminum extrusion 18 keeping the overall package size small and install/removal simple. The retractable overhead shade assembly is also spring loaded by the tensioning mechanism which spring loaded feature allows for automatic retractable shade 12 tensioning and automatic retraction to the stowed position generally within the aluminum extrusion 18. When retracted to the stowed position, the attachment rod 14 remains accessible to be grasped by an operator to pull the retractable shade 12 to the deployed position when desired. Other tensioning mechanisms are contemplated without departing from the scope of the invention.

Tensioning mechanisms and corresponding structures for winding window shades are commercially available. A particularly preferred unit is a sunshade system manufactured by Macauto Industrial Co., Ltd. of Tainon City, Taiwan. Examples of systems are described in U.S. Pat. App. No. 20050257903 A1 having a tensioning device with a coil spring, flat spiral spring, or wire spring for subjecting a winding shaft to tension in the wind up direction of the connected shade, U.S. Pat. No. 8,302,655 for a spring driven device for automatic winding where a shade member is biased by a spring member toward a rolled-up state, and U.S. Pat. App. No. 20120180961 incorporating a coil spring member biasing a shade, wound on a winding shaft, toward a rolled-up state. The disclosures in U.S. Pat. No. 8,302,655, U.S. Pat. App. No. 20120180961 and U.S. Pat. App. No. 20050257903 A1 are incorporated herein by reference.

The aluminum extrusion 18 is operably connected to the vehicle in a position to allow any hard or soft top assembly remain on the vehicle and not diminish the use of the hard or soft top assembly in any way. Typically, the aluminum extrusion 18 is connected to the vehicle to be orientated in a cross-car direction relative to the fore and aft direction. In a preferred embodiment, the cross-car location is generally adjacent above and behind the front seats, and the opening for the retractable shade 12 deployment faces toward the direction of the windshield. In an alternative embodiment, the cross-car location is generally above and behind the front seats, but the opening for the retractable shade 12 deployment faces toward the direction of the rear of the vehicle. In yet another embodiment, the cross-car location of the unit 18 is generally above and behind the rear passenger seats or cargo area, e.g., such as on a rearward section of a sport bar or rear cross-car bar, and the opening for the retractable shade 12 deployment faces toward the direction of the front seats, and when deployed covers the cargo and/or rear passenger area, and optionally, in another embodiment, further deploys above the front passenger compartment. In yet another embodiment, a dual shade is provided that is center mounted cross-car and has a front shade and rear shade operated independently.

The aluminum extrusion 18 is connected to the vehicle with a plurality of fasteners, e.g., clamps, 2-piece clamps, bolts, screws, ring nuts, specialty bolts, brackets, mounts, knobs, mushroom knobs, or any other fasteners suitable for easily and securely connecting to the vehicle, and combinations thereof. Exemplary attachment methods will be explained in further detail below. In a preferred embodiment, the fastener connection points are on top surfaces of vehicle member(s), e.g., sport bar(s), and/or crossmember or cross-bar, etc; and, the unit is center (e.g., B-pillar area) and/or rear mounted, etc, as will be explained in greater detail below. Front mounted is also contemplated without departing from the scope of the present invention. In another embodiment, the fastener connection points are on front and/or rear surfaces of vehicle member(s).

The aluminum extrusion 18 has end caps 20. These caps 20 are secured to the aluminum extrusion main body with a snap fit engagement and/or one or more fastener. In one embodiment, they are selectively removable for repair, maintenance or replacement of any elements within the self contained unit, without departing from the scope of the present invention.

In one embodiment, the attachment rod 14 is a composite rod, carbon fiber, or other material suitable for providing strength and structure. The attachment rod 14 can be shaped to generally match the windshield dimensions and/or contour, e.g., slight curve or straight, so the retractable shade 12 generally follows the windshield shape for better overhead coverage, depending on the application.

The right half of the retractable overhead shade assembly 10 and corresponding features are substantially mirror image/symmetrical to the left half of the cover assembly retractable overhead shade assembly and corresponding features depicted in the figures.

In an alternative embodiment, the attachment features 16 are straps that snap to a plate near the footman loops, or any other kind of strap, bungee, or cord of any kind that snaps, ties, loops onto, or otherwise connects to the footman loops when desired.

In another embodiment, a fiber windshield rod provides structure that conforms fabric of the cover to the windshield contour. A snap stud plate provides secure fastening of the fiber windshield rod to the snap stud plate utilizing a predetermined fabric web strap with a mating snap eyelet.

Referring to the figures generally, FIG. 1 illustrates an exemplary installation area of the retractable overhead shade assembly 10 center mounted to the vehicle, e.g., onto the vehicle sport bar(s) construction and/or any crossbar. The area that will be covered by this placement when the retractable shade 12 is in the deployed position is generally the front cockpit. in another embodiment, the assembly 10 is modified for deployment in the other direction or otherwise adjusted to apply shade to the rear passenger area.

Figure 2:
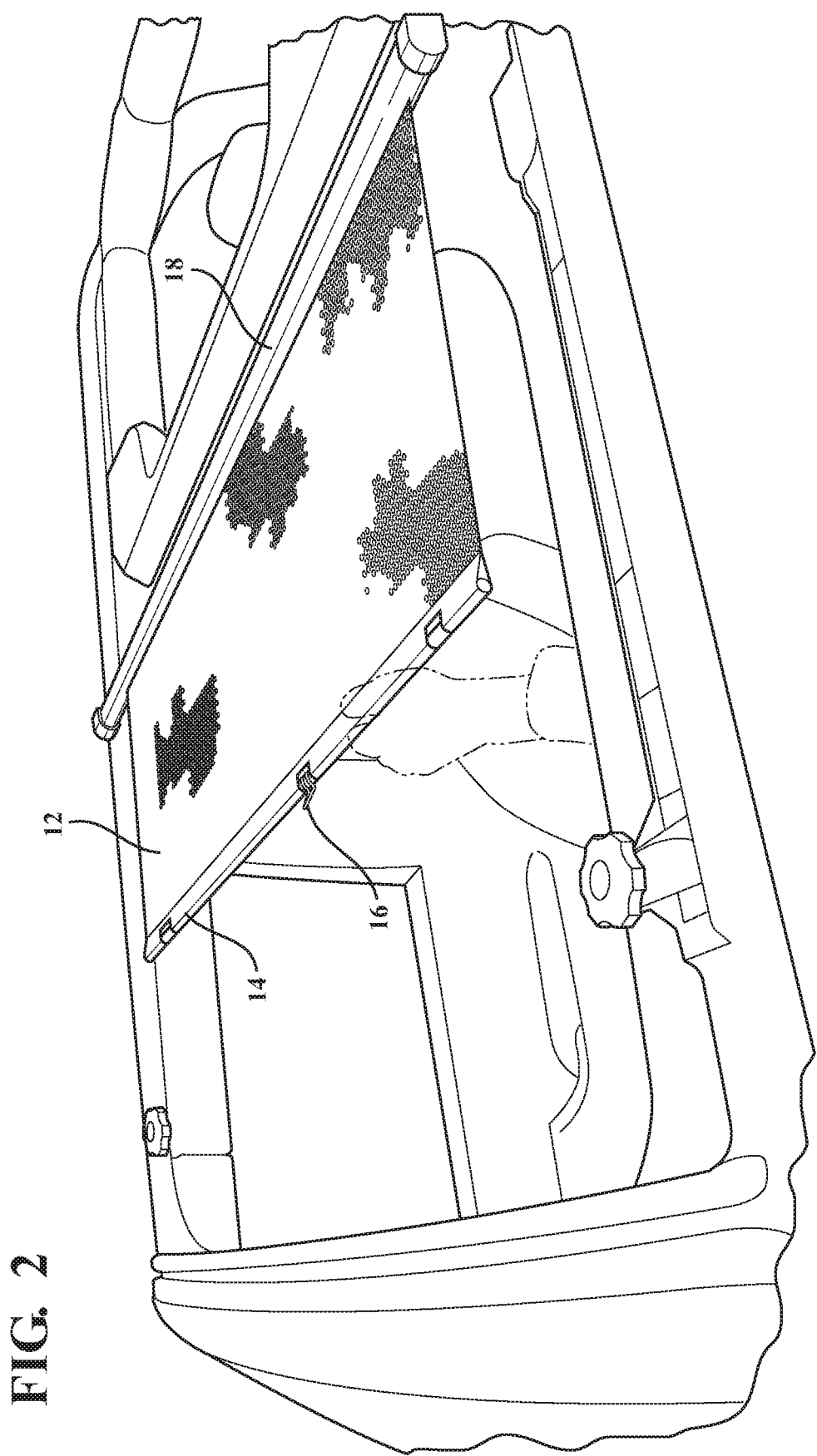
FIG. 2 is a front top perspective view of the retractable shade of FIG. 1 being deployed toward a closed position, in accordance with the present invention.

FIGS. 2-3 show the retractable shade unit 10 in the installed position and the retractable shade 12 itself being deployed by hand forward. The retractable shade 12 is operable sized to have a width operable to substantially cover the overhead opening into the vehicle, e.g., covering generally the front cockpit. The width is greater than depicted. The shade is sized to extend directly adjacent the side sport bars, above the sport bars, or adjacent or along the door rail, for example. The shade can also have a varied width or cutouts, such as to prevent interference with vehicle structure(s) and provide optimal overhead coverage.

FIG. 4 illustrates that the retractable shade 12 is deployed forward until the attachment rod 14 is hooked at the front to protect the occupants. The shade 12 width and/or attachment rod 14 length is greater than that depicted. There is a hook 16 on the attachment rod 14, in accordance with one method of selectively attaching the front of the retractable shade to the upper windshield area. In particular, to footman loops 22 on the vehicle windshield.

Referring now to FIGS. 5-7, a retractable overhead shade assembly shown generally at 110 is provided with a dual shade according to another embodiment of the present invention, where like numbers indicate like parts to FIGS. 1-4. A dual shade system with a front shade 112a and rear shade 112b is provided. A reinforcement bar 14 is provided with the front and/or rear shade 112a, 112b and is secured to the vehicle when in the deployed position(s) by a plurality of attachment features 16. Each retractable shade 112a, 112b moves independently between a respective deployed position and stowed position (any number of intermediate positions is contemplated without departing from the scope of the invention), such that an operator can choose to use either one shade or both shades at the same time. Optionally, each retractable shade 112a, 112b has at least one tensioning mechanism in cooperation with the retractable shades 112a, 112b, as described previously.

A single housing 118, e.g., aluminum extrusion, for mounting to the vehicle (e.g., center mounting shown in FIG. 7) and holding the dual shade is provided. The housing 118 is a double mount housing where the front half 118a is a mirror image to the rear half 118b, each half having a larger channel 122 for the respective shade with a smaller opening 124 to allow the shades 112a, 112b to deploy while preventing the shade core or back end 126 (and any tensioning mechanism coupled thereto) from moving laterally out of the opening 124 (see FIG. 6). The bottom of the housing 118 has at least one mounting chamber 128 that is an opening or a channel 128 formed in the housing 118 to receive an opposing first attachment feature 130 to mount the housing 118 to the vehicle, as will be described further below. Preferably, the mounting chamber 128 is generally T-shaped to slidably receive the first attachment feature 130 that is generally T-shaped (any other shaped chamber and any other specialty bolt or unique profiled head is contemplated without departing from the scope of the present invention, e.g., L-shaped, bulbous, dovetail, etc). The first attachment feature 130 is an elongated upstanding feature of operable length to fit along the mounting chamber 128, and/or smaller (e.g., depicted in FIGS. 8B and 9B) to mount at intervals or multiple locations along a crossbar. Most preferably, the T-mount has a set screw from the top and is located in 2-3 spots across the sport bar 136. Other attachments feature(s), e.g., clamps, fasteners, mounts, brackets and/or fixtures of any kind and combinations thereof, are contemplated without departing from the scope of the present invention. A fastener 132, e.g., set screw, is provided through the top of the housing 118 (e.g., via a threaded aperture) into engagement with the top of the T-shaped first attachment feature 130 to hold the housing 118 against the first attachment feature 130. A set screw, thumbscrew or any other fastener of any kind and combinations thereof is contemplated without departing from the scope of the present invention.

At least one end cap on the ends of the housing 118 is also provided, but omitted from the drawings for clarity. The dual shade system has the aforementioned benefits of the single shade system, but, additionally provides independent overhead coverage in either direction. Thus, when front cockpit coverage, and/or rear passenger or cargo area coverage is desired, the respective shade 112a, 112b is deployed, or, both shades 112a and 112b are deployed.

Figure 8A:
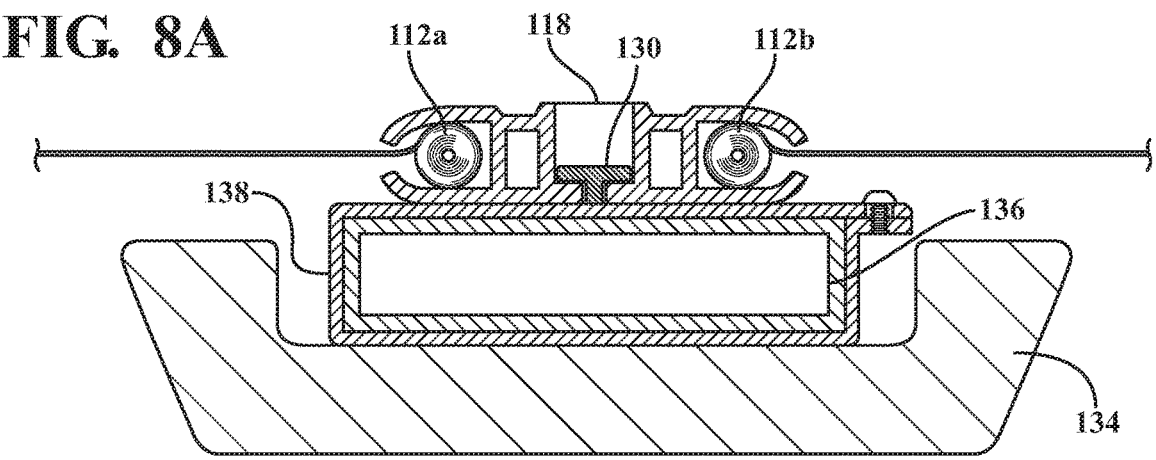
FIGS. 8A-8B is a side elevation view and a perspective view of a no drill installment attachment method for mounting the housing of the retractable overhead cover assembly using a clamp installed around the sport bar of the present invention.
Figure 8B:
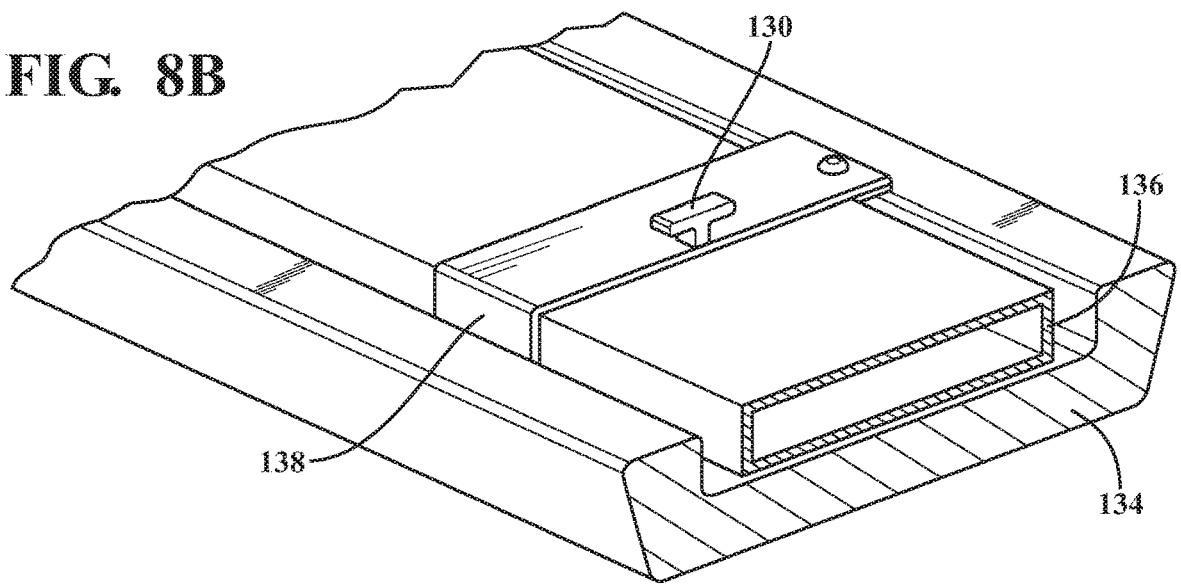

FIGS. 8A-8B depict mounting the dual shade system to the vehicle with no drilling to install, in accordance with other embodiments of the present invention, where like numbers indicate like parts of FIGS. 5-7. A vehicle sound bar 134 and metal sport bar 136 is shown, which are located crosscar, typically, centrally located near the B-pillars, however, any other crossbar is contemplated without departing from the scope of the present invention. At least one clamp 138 is slidably installed around the sport bar 136. Preferably, at least one clamp 138 is provided generally toward both ends of the housing 118. This clamp 138 is operably connected to the housing 118. In one embodiment, the T-shaped first attachment feature 132 is operably connected to the top of the clamp 138 for connecting the housing 118 to the clamp 138, which mounts the housing 118 to the sport bar 136. A plurality of attachment locations along the sport bar 136 can be used. Incorporation with a single shade or pivotal shade system is also contemplated without departing from the scope of the present invention. Other attachments feature(s), e.g., clamps, fasteners, mounts, brackets and/or fixtures of any kind and combinations thereof, are contemplated without departing from the scope of the present invention.

Figure 9A:
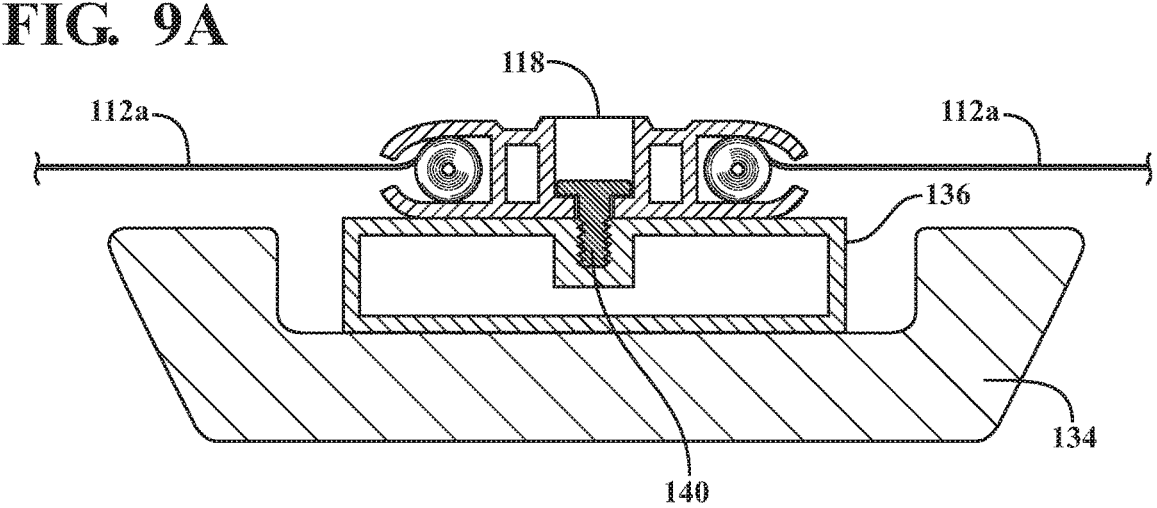
FIG. 9A is a side elevation view of a drill installment attachment method for mounting the housing of the retractable overhead cover assembly using a drilled and tapped fastener or ring nut inserted into the sport bar of the present invention.
Figure 9B:
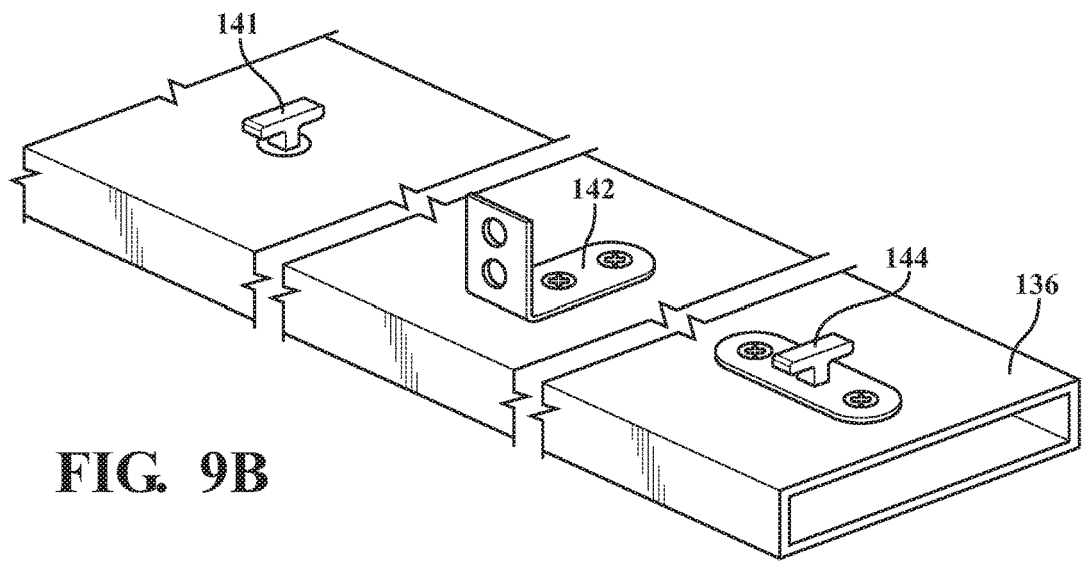
FIG. 9B is a perspective view of alternative drill installment attachment methods for mounting the housing of the retractable overhead cover assembly using a unique fastener, bracket, and/or T-style fastener installed to the sport bar of the present invention.

FIGS. 9A-9B depict mounting the dual shade system to the vehicle with using drill installation, in accordance with other embodiments of the present invention, where like numbers indicate like parts of FIGS. 5-8B. A vehicle sound bar 134 and metal sport bar 136 is shown, which are located crosscar, typically, centrally located near the vehicle B-pillars, however, any other crossbar is contemplated without departing from the scope of the present invention. A clamp is not used. Instead, a first attachment feature 140 is drilled and tapped or a ring nut inserted directly into the sport bar 136. FIG. 9B depicts a first attachment feature 140 operably connected to the sport bar 136 that is a specialty bolt with unique head profile to attach the housing 18, 118 of the retractable overhead cover assembly to the sport bar 136 (or any other cross-car bar). FIG. 9B also depicts an alternative first attachment feature 142 that is an L-bracket or any other suitable bracket shape operably connected to the sport bar 136 to attach the housing 18, 118 of the retractable overhead cover assembly to the sport bar 136 (or any other crossbar). FIG. 9B also depicts another alternative first attachment feature 144 that is a T-shape attachment operably connected to the sport bar 136 that provides a T-interface with the housing 18, 118 of the retractable overhead cover assembly to connect to the sport bar 136 (or any other crossbar). A plurality of attachment locations along the sport bar 136 can be used. Incorporation with a single shade or pivotal shade system is also contemplated without departing from the scope of the present invention. Other attachments feature(s), e.g., clamps, fasteners, mounts, brackets and/or fixtures of any kind and combinations thereof, are contemplated without departing from the scope of the present invention.

FIGS. 10-14 depict mounting of retractable overhead shade assemblies in various locations on the vehicle, in accordance with other embodiments of the present invention.

Figure 10:
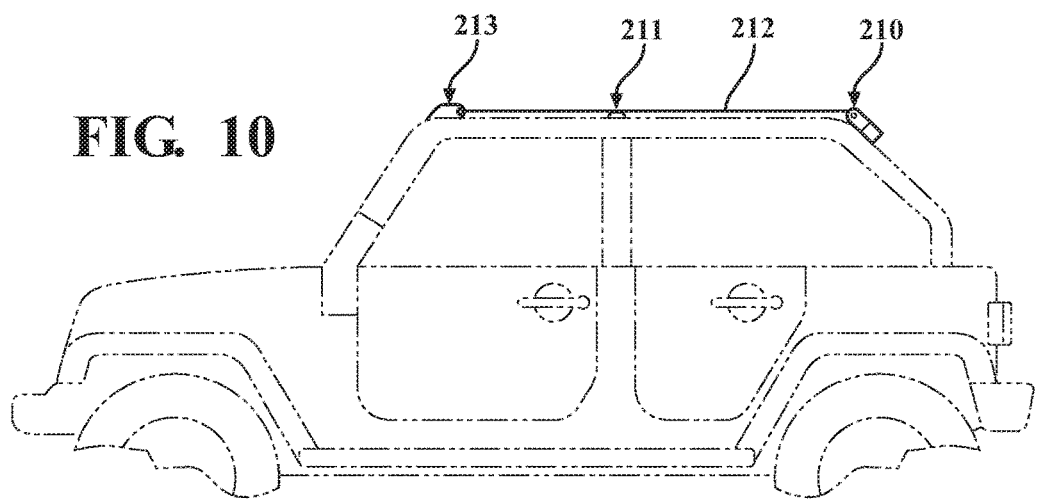
FIG. 10 is a side elevation of a vehicle having a single unit shade design rear mounted to the vehicle, in accordance with another embodiment of the present invention.
Figure 11:
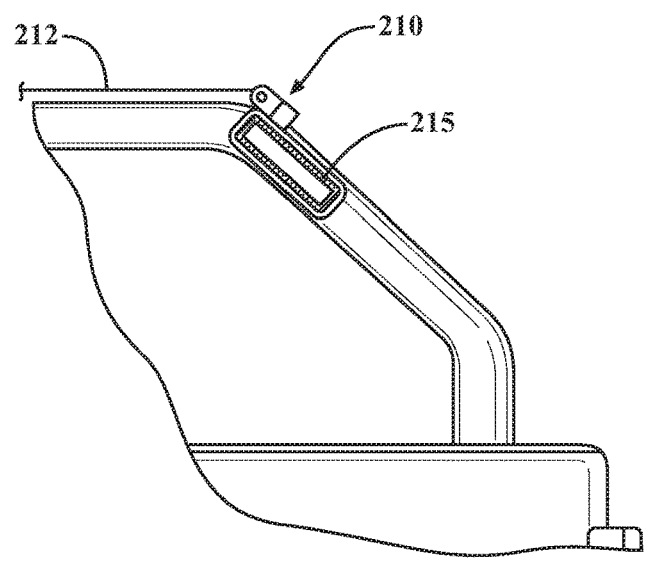
FIG. 11 is a side elevation of a retractable overhead cover assembly mounted at a B-pillar of the vehicle that is a single shade unit, according to the present invention.

FIG. 10 illustrates a rear mounted retractable overhead shade assembly generally shown at 210 that has a retractable shade 212 pulled forward to a deployed position, and optionally, one or more intermediate positions, according to one embodiment. The housing of the assembly 210 is operably connected toward the rear of the vehicle, preferably, on the rearmost crossbar. The retractable shade 212 is pulled to an intermediate stop location indicated generally at 211 to cover at least the rear occupants and/or cargo area. The retractable shade 212 is further pulled the full length to the windshield location indicated generally at 213 to additionally cover the front occupants, in another embodiment. Other mounting and deployment positions are contemplated without departing from the scope of the present invention. In another embodiment, the retractable overhead shade assembly 210 is operably mounted at the B-pillar, either at a fixed location for front or rear coverage with the retractable shade 212, or, mounted on pivots for optional front or rear coverage, according to another embodiment. FIG. 11 illustrates an exemplary retractable overhead shade assembly 210 mounted on a rear most crossbar 215. The assembly 210 is operably mounted to the crossbar 215, e.g., by clamp no drill, drill and tap or drill and rivet nut, or any other suitable mounting of any kind and combinations thereof.

Figure 12:
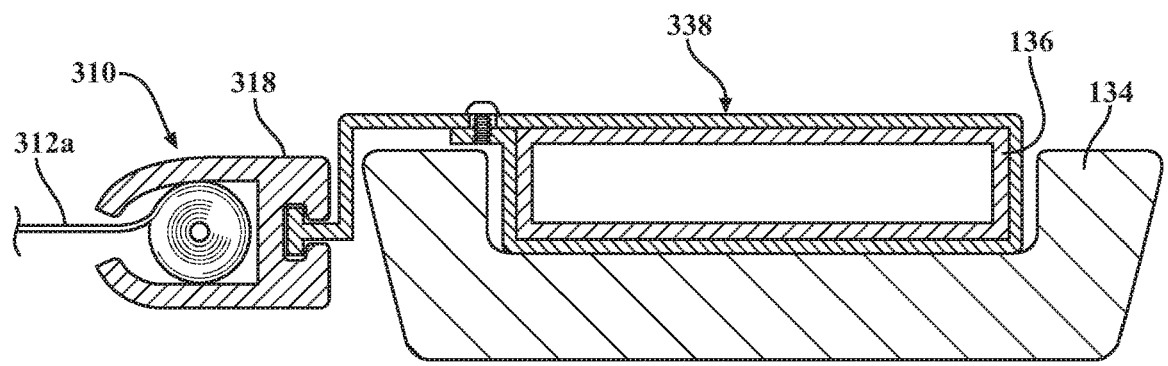
FIG. 12 is a side elevation of a two unit retractable overhead cover assembly mounted at a B-pillar of the vehicle, according to additional embodiments of the present invention.
Figure 13:
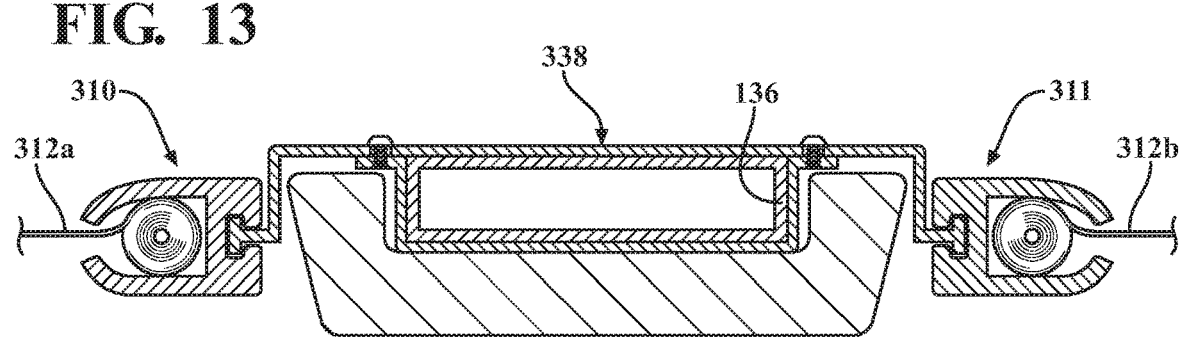
FIG. 13 is a side elevation of a retractable overhead cover assembly mounted at a B-pillar of the vehicle that is a pivotal single shade unit, according to an embodiment of the present invention.

FIG. 12 illustrates a retractable overhead shade assembly generally shown at 310 with a retractable shade 312, where the assembly is mounted at the B-pillars using a clamp style fixture generally shown at 338 to provide a fixed B-pillar mount. The clamp bracket 338 is operably connected to the housing of the assembly 310, e.g., similar as described above, but operably adapted or by any other suitable fasteners or features for mounting the assembly 310 in the desired location. The clamp fixture 338 is slidably or otherwise stalled around or on the sport bar 136 adjacent the sound bar 134. Preferably, at least one clamp bracket 338 is operably connected toward both ends of a 318 housing of the retractable overhead shade assembly 310. In this embodiment, the retractable overhead shade assembly 310 is installed for front use by mounting in front of the sound bar 134 and deploying the retractable shade 312 forward to cover the front occupants. Alternatively, the retractable overhead shade assembly 310 is installed for rear use by mounting to the rear of the sound bar 134 and deploying the retractable shade 312 rearward to cover the rear occupants, and optionally, further the cargo area. In another embodiment, the front unit retractable overhead shade assembly 310 is mirrored to provide two single units sharing the clamp bracket 338 for front and rear occupant coverage. FIG. 13 depicts a fixed 6-pillar two unit system. A front retractable overhead shade assembly 310 unit, and, additionally, a rear retractable overhead shade assembly 311 is provided. Both are operably connected to the single clamp bracket 338 for independently deploying the front retractable shade 312a and rear retractable shade 312b. Other attachments feature(s), e.g., clamps, fasteners, mounts, brackets and/or fixtures of any kind and combinations thereof, are contemplated without departing from the scope of the present invention.

Figure 14:
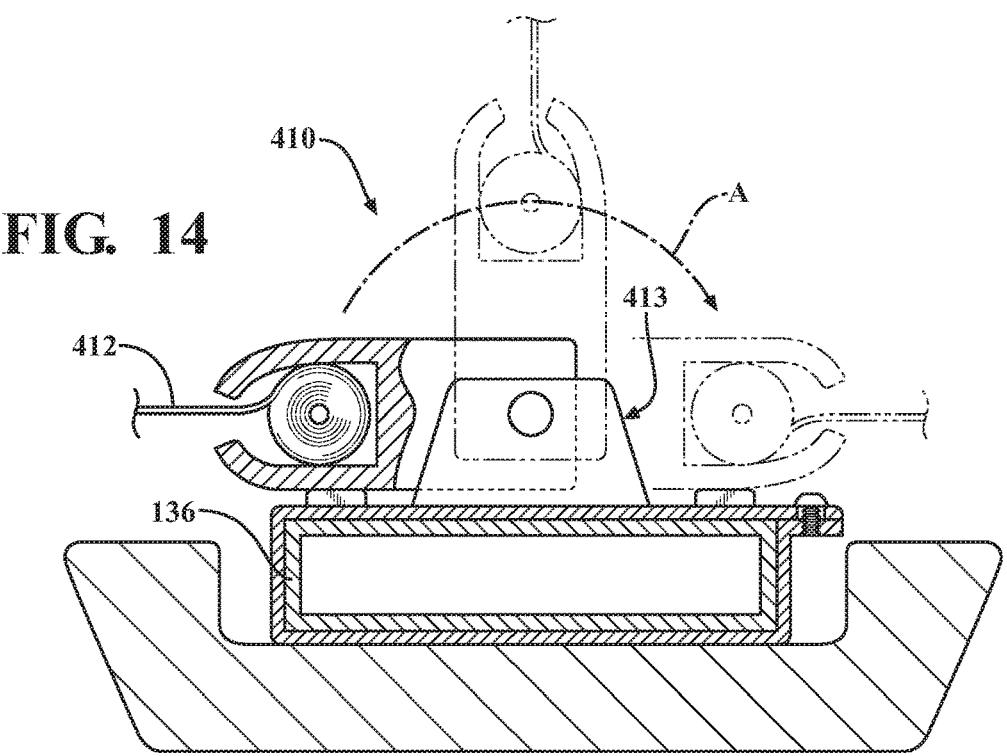
FIG. 14 is a side elevation of a retractable overhead cover assembly mounted to a rearmost crossbar of the vehicle, according to an embodiment of the present invention.

FIG. 14 depicts a pivoting single shade retractable overhead shade assembly 410 unit according to another embodiment. The assembly 410 is operably mounted to the sport bar 136 (other locations are contemplated without departing from the scope of the present invention), and is provided with a pivoting arrangement so that a retractable shade 412 is used for front occupant coverage when the assembly 410 is in a first position and rear occupant coverage when the assembly 410 is in a second position. The single shade unit 410 is supported on the ends, e.g., by a bracket/pin, creating a pivot point shown generally at 413. The retractable shade 412 covers the front occupants when deployed forward. When desired, retractable shade 412 is stowed and the assembly 410 is pivoted about the pivot point 413, illustrated at arrow "A", for rear passenger coverage when the retractable shade 412 is deployed rearward.

Figure 15:
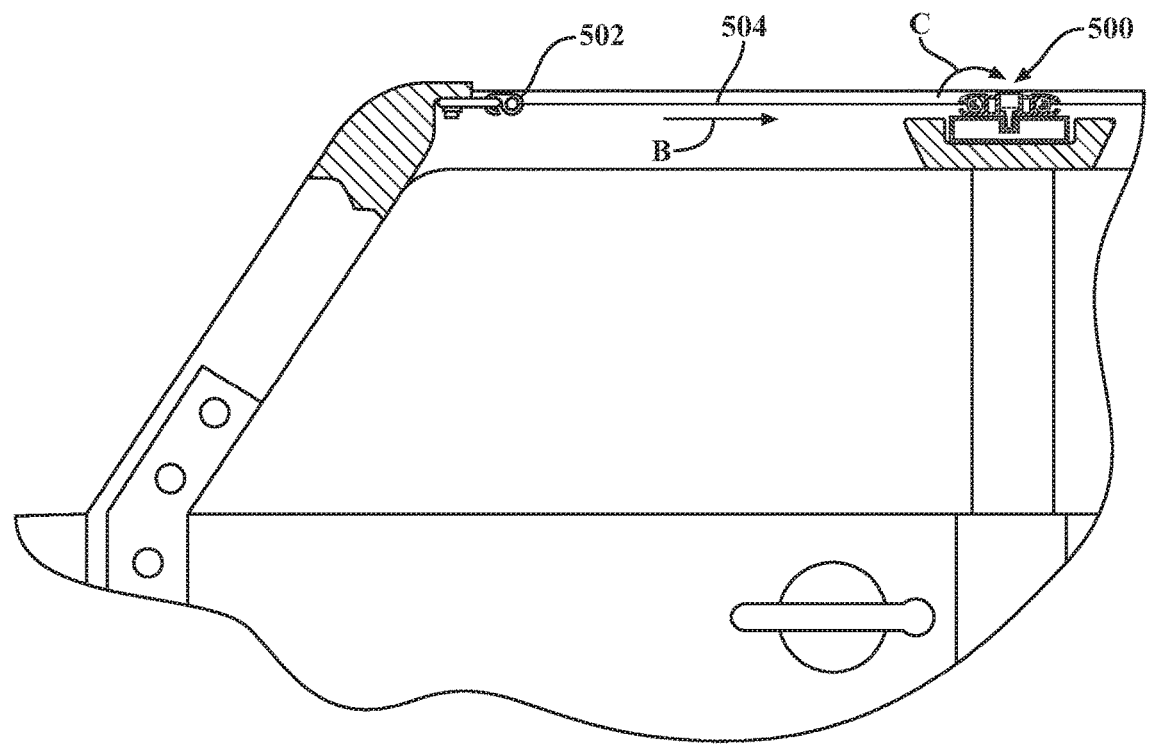
FIG. 15 is a side elevation of a retractable overhead cover assembly having a tensioning mechanism for the shade and selective hook attachment to the vehicle windshield area to hold the shade in deployed position, according to an embodiment of the present invention.

FIG. 15 depicts a tensioning mechanism shown generally at 500 that is a spring tension for keeping the retractable shade utilizable in any of the aforementioned embodiments tight while also allowing for automatic retraction/stowage, as illustrated by arrows, "B" and "C". FIG. 15 also depicts the front attachment rod 502 utilizable in any of the aforementioned embodiments hooked to the upper windshield area of the vehicle when the retractable shade 504 is deployed.

Figure 16:
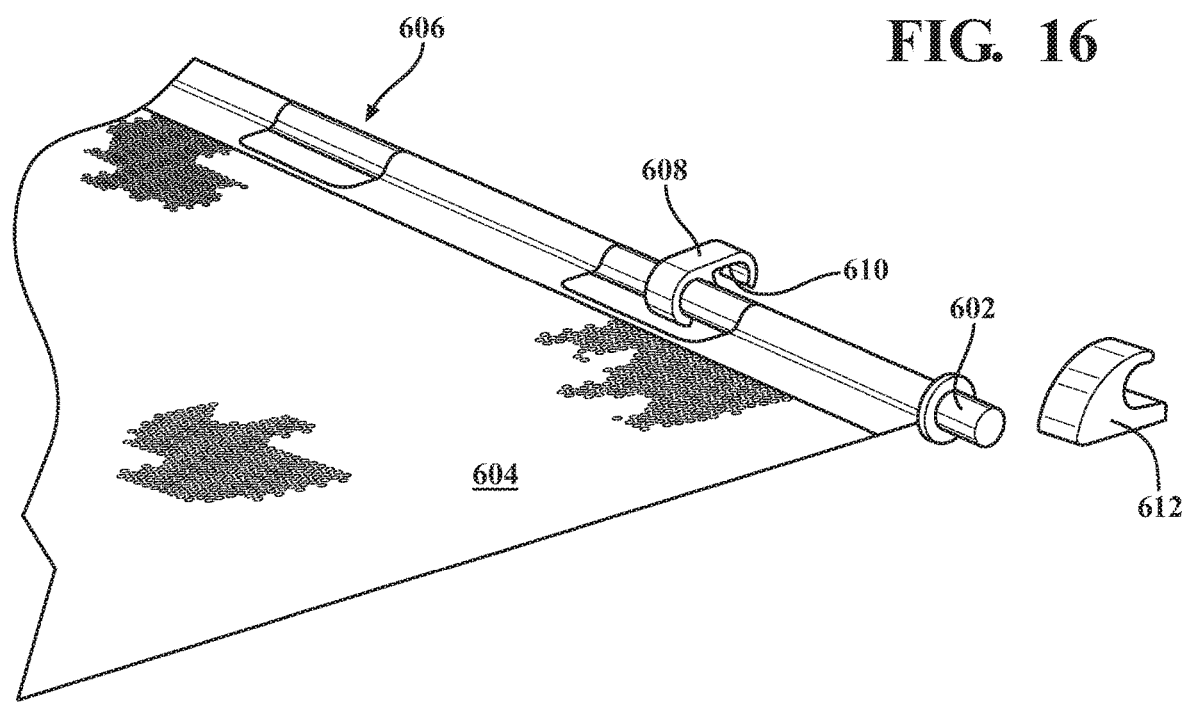
FIG. 16 is a rear perspective view depicting exemplary attachment methods for selectively attaching the shade to the vehicle in the deployed position, according to additional embodiments of the present invention.

FIG. 16 depicts various options for attachment to the vehicle for an attachment rod 602 operably coupled to a retractable shade 604, e.g., sewn pocket, end pockets, pocket with intermittent gaps, etc. and combinations thereof. One or more of these attachment methods is utilizable with the aforementioned embodiments. However, other suitable attachment features are contemplated without departing from the scope of the present invention. The rod 602 is attached to the front windshield area and/or rear of the vehicle, e.g., at a rear most crossbar, and/or B-pillars, and/or sport bar or crossbar at B-pillar area. In one embodiment, there is one or more openings left in the material of the retractable shade 604 so that the attachment bar 602 is left exposed to allow remote hooking, e.g., hooks, straps, etc. This open area is shown generally at 606. In another embodiment, there is one or more openings left in the material of the retractable shade 604 so that the attachment rod 602 is left exposed to receive a hook 608 operably connected to the rod 602 and carried with the rod 602. The hook 608 has a vehicle attachment feature 610 to hook to the vehicle, e.g., to footman loops, brackets, or any other vehicle mount provided on the vehicle (e.g., at the windshield area, B-pillar area, rearmost crossbar or any other crossbar, etc). In yet another embodiment, end attachments 612 are fixed on the vehicle by fasteners, and shaped to hold the ends of the attachment bar 602 so that the ends are locked into the mount 612 on the vehicle and held by tension.

In another embodiment, a retractable shade management system is provided. Preferably a side rail management system. Any of multiple installation locations, housing profiles and vehicle attachment methods are contemplated without departing from the scope of the invention, e.g., center mounted cross car location, rear mounted cross car, rearward mounted cross car, front cockpit fore-aft center or side mounted, rear passenger compartment fore-aft center or side mounted, etc. Incorporation with any retractable shade system, e.g., dual shades, single shade, front rear and/or cargo compartment coverage, and/or pivoting units, is contemplated without departing from the scope of the invention. The retractable shade management system generally assists with tensioning the retractable shade typically by operably holding the sides of the shade, e.g., using standoff(s), ledge(s), stop(s), catch(es), hook(s), bracket(s), strap(s), linkage(s), track(s), rail(s), etc, and combinations thereof. It is to be readily appreciated that other methods of actuation of the retractable shade is within the scope of the present invention such as other arrangements to lock the edges of the retractable shade, e.g., to prevent flapping in the wind, ease shade movement or prevent binding during deployment/ stowage, etc.

FIGS. 17-17B depict a retractable overhead shade assembly 710 according to another embodiment of the present invention incorporating at least one side rail system generally shown at 702 for cross car tension of a retractable shade 704. The side rail system 702 is a track, L-shaped, C-shaped channel, or any other suitable geometry for holding a retaining feature 706 of the retractable shade 704. Preferably a pair of rails 702 is operably attached along opposing side sport bars and operably to keep cross car tension of the retractable shade 704, indicated as, "T" (see FIGS. 17 and 17A). The sides of the retractable shade 704 are provided with at least one retaining feature 706 operably configured to slide within or otherwise move relative to the side rails 702 and held by the side rails 702 when the retractable shade 704 is in the deployed position. A tri-fold or other shade geometry and supporting features, e.g., fabric management bows, etc, are also contemplated without departing from the scope of the present invention. Alternative retaining features 706, e.g., rollers, etc, and geometries are contemplated without departing from the scope of the present invention. Rather than an elongated side rail 702, intermittent features to hold the edges of the retractable shade 704 are also contemplated without departing from the scope of the present invention (e.g., standoff(s), ledge(s), stop(s), catch(es), hook(s), bracket(s), strap(s), or any other suitable attachment, etc, and combinations thereof.

FIG. 17B depicts an exemplary no drill installation embodiment, where a clamp 708 is provided. Any clamp(s) and/or fastener(s) suitable to attach the side rail 702 to the sport bar or other vehicle component(s) is/are contemplated without departing from the scope of the present invention. The clamp 708 is operably connected to the side rail 702, e.g., via fastener(s) 716, and is operably attached to the sport bar 712 to affix the side rail 702 to the sport bar/roll bar 712.

The attachment rod 712 is selectively connected to the upper windshield area as described previously. The assembly 710 is depicted as a single shade; however, the unit can alternatively be a dual shade, pivoting shade, etc. The assembly 710 is depicted as covering the front cockpit, however, it is readily appreciated that the assembly 710 is adaptable to rear mount, and that the rail system is adaptable to use with the front and/or rear and/or cargo compartments.

FIG. 17C depicts exemplary side rails (702a to 702d) and retaining features (706a to 706d), which utilization of the side rails 702a-d helps keep tension, 'T', across the retractable shade 704. The side rail and retaining features used depend on the application. Various geometries of the respective side rails 702a-d and corresponding retaining features 706a-d are possible, including, but not limited to the multiple extrusion profiles depicted in FIG. 17C (e.g., side rail 702a having an inward facing C-shaped channel 718a and a knob shaped retaining feature 706a or T-shaped, a side rail 702b with a channel 718b that is an outward facing channel and a retaining feature 706b that is hook shaped with a larger diameter end, a side rail 702c with a channel 718c that is T-shaped and a retaining feature 706c that is T-shape, or a J-rail style such as a side rail 702b that is a J-rail shape and a retaining feature 706d held within the J-rail, etc). The side rails 702a-d are stand alone pieces or are fastened to the shade unit 710. The side rails 702a-d are affixed to the vehicle, e.g., fore/aft sport bar 712, through drilling and bolting, clamping, threaded knobs, screws, webbing straps, or any other suitable attachment and combinations thereof.

Figure 18:
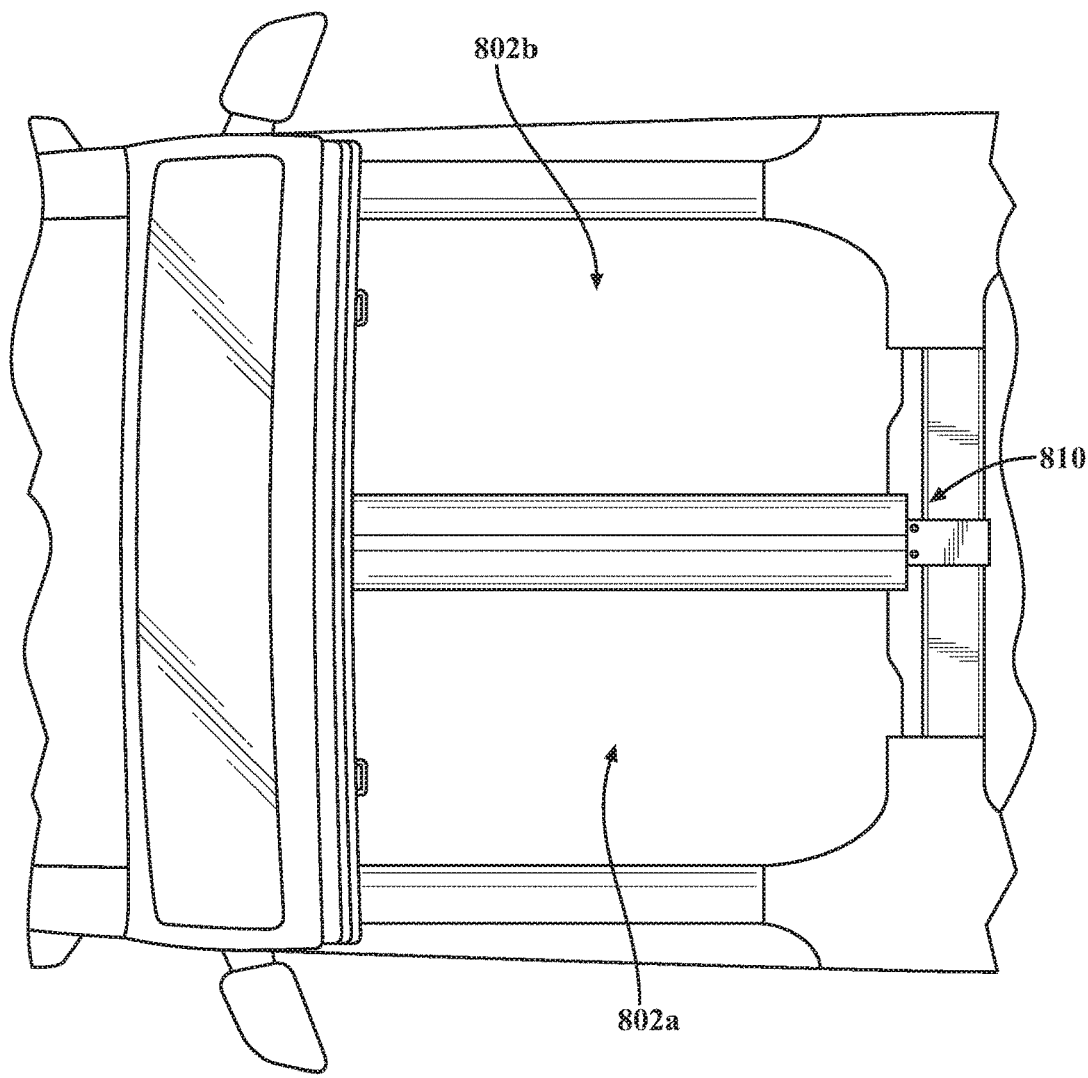
FIG. 18 is a top plan view of a retractable overhead cover assembly that is a fore-aft center mounted dual shade, in accordance with yet another embodiment of the present invention.

FIG. 18 shows a retractable overhead cover assembly that is a fore-aft center mounted dual shade indicated generally at 810, in accordance with yet another embodiment of the present invention. The retractable shades 804a and 804b independently pull from the unit mounted in the center and operable affixes over the doors. Thus, the driver side shade 804a can be deployed when desired, and the passenger side shade 804b can be deployed independently from the driver side shade 804a when desired. The dual roll extrusion design operably mounts fore-aft in the vehicle and the shades pull out to affix over the door rails or any other suitable vehicle component.

Figure 18A:
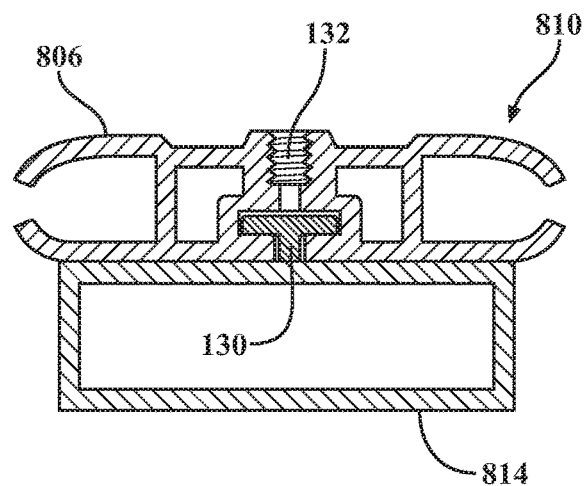
FIG. 18A is a side elevation of an attachment method for mounting the housing of the retractable overhead cover assembly using at least one fastener, according to an embodiment of the present invention.

FIG. 18A depicts an exemplary set screw 132 and T-attachment 130 method for the assembly 810 mounting, however, it is readily appreciated that other attachment methods are contemplated, such as those set forth above according to the present invention. FIG. 18A depicts the assembly 810 attached to another overhead component 814, e.g., such as a storage compartment, lighting source, sunglass holder, etc).

Figure 18B:
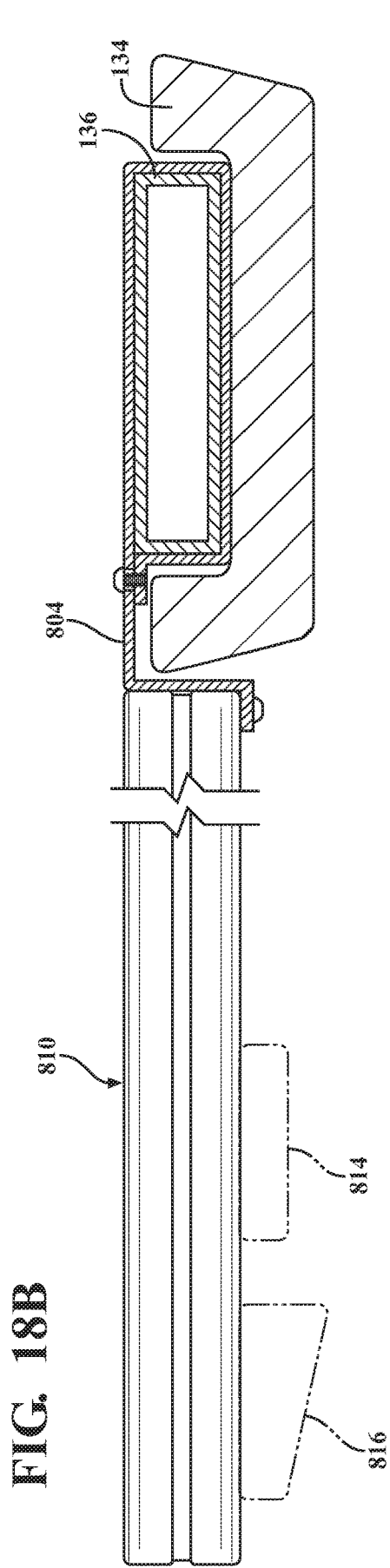
FIG. 18B is a side elevation of the retractable overhead cover assembly of FIG. 18 according to the present invention.

FIG. 18B depicts exemplary attachment methods where a housing 806 of the assembly 810 is operably connected at one end to a clamp 804 operably connected to the sport bar 136, e.g., clamped around and/or onto any surface of the sport bar and/or sound bar 134. The housing 806 of the assembly 810 is operably connected at the other end to the upper, central windshield area (preferably, windshield header), such as mounted to the center footman loop or drilled and fastened to the windshield frame, etc. The retractable shades 802a, 802b each have an attachment bar or other suitable attachment to operably connect to features provided on the vehicle for holding the retractable shades 802, 802b under tension in the deployed position. Optionally, one or more additional products/accessories 812, 814, etc (e.g., storage compartment, light source, etc) are provided to the underside of the housing 806 anywhere along the assembly 810 for access by the driver/occupant(s).

The assembly 810 is depicted as covering the front cockpit, however, it is readily appreciated that the assembly 810 is adaptable to fore-aft rear mount, and for covering the front and/or rear and/or cargo compartments. It is also contemplated that the assembly 810 is mounted to the front or rear side sport bar or front and/or rear door rails or other vehicle component(s) for single shade deployment in the cross car direction to cover half and/or the entire front, rear, and/or cargo compartments.

Referring now to FIGS. 20-23 generally, a retractable overhead shade assembly is shown generally at 910, in accordance with another embodiment of the present invention, that includes a first and a second shade. The assembly 910 includes a retractable shade 912 (e.g., front shade) operably connected to an attachment rod 914 (e.g., rod 914 in sewn shade pocket). At least one, most preferably, a plurality of attachment features 916 are operably connected to the attachment rod 914 for connecting the shade to the vehicle in the deployed position, e.g., hooks attachable to footman loops 915 of the vehicle at the windshield header. The retractable shade 912 is operably stowed in a housing 918. When retracted to the stowed position substantially within the housing 918, the attachment rod 914 remains accessible to be grasped by an operator to pull the retractable shade 912 to the deployed position when desired. Other tensioning mechanisms are contemplated without departing from the scope of the invention.

At least one bracket 920 toward each end of the housing 918 is connected to the housing 918 with at least one fastener 924, e.g., screw, nut and bolt. The bracket 920 connects the housing 918 to the vehicle with at least other fastener 938, e.g., thumb screw, mushroom knob, etc. Preferably, the housing 918 is connected to a rear header 922 of the vehicle (e.g., a rear header provided for a hard top portion). Attachment to the support bar/sport bar, door rail or other vehicle component is contemplated depending on the application without departing from the scope of the present invention. The housing 918 also has end caps 924 on each end.

A plurality of rear panel fasteners 926, preferably, hook and loop, operably connect a second shade 928 (e.g., rear shade) to the housing 918. The second shade 918 is preferably a non-retractable fabric shade. The second shade 928 generally covers the area rearward of the housing 918 to the cross-car rear header 922 or hard top portion 930 of the vehicle.

A plurality of elastic fasteners 932, e.g., elastic robs, operably connect the second panel 928 to the vehicle. Other fasteners, e.g., web straps, etc, depending on the application are contemplated without departing from the scope of the present invention. The fasteners 932 are connected for tensioning the second panel 928 in the cross car direction and fore and aft. Most preferably, the fasteners 932 are connected to the sport bars 934, sound bars 936, or any other suitable component.

The assembly 910 is used on a 2-door or 4-door hard top SUV, however, other vehicles are contemplated without departure from the scope of the present invention.

In one embodiment, the original equipment manufacturer front cockpit panels are installable above the assembly 910 when a closed cockpit experience is desired. In another, a foldable sunroof assembly is installable above the assembly 910 moveable from a closed and sunroof position.

Figure 19:
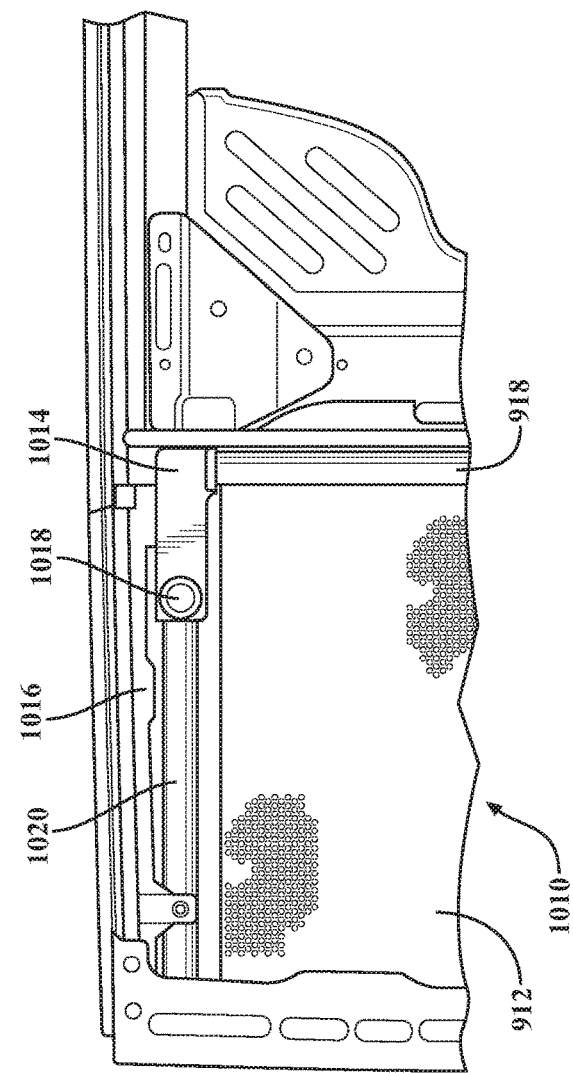
FIG. 19 is a top view of a retractable overhead cover assembly for a 2-door or 4-door soft top, in accordance with another embodiment of the present invention.
Figure 20:
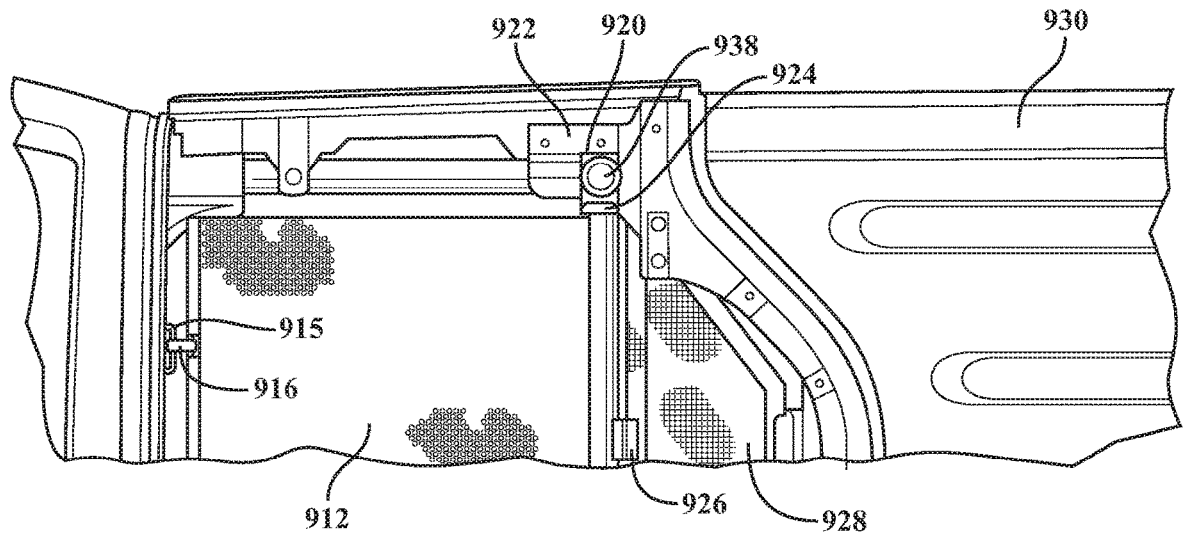
FIG. 20 is a top view of the retractable overhead cover assembly depicted deployed with a rear panel of a dual panel connected to the vehicle near a hardtop roof portion, according to another embodiment of the present invention.
Figure 21:
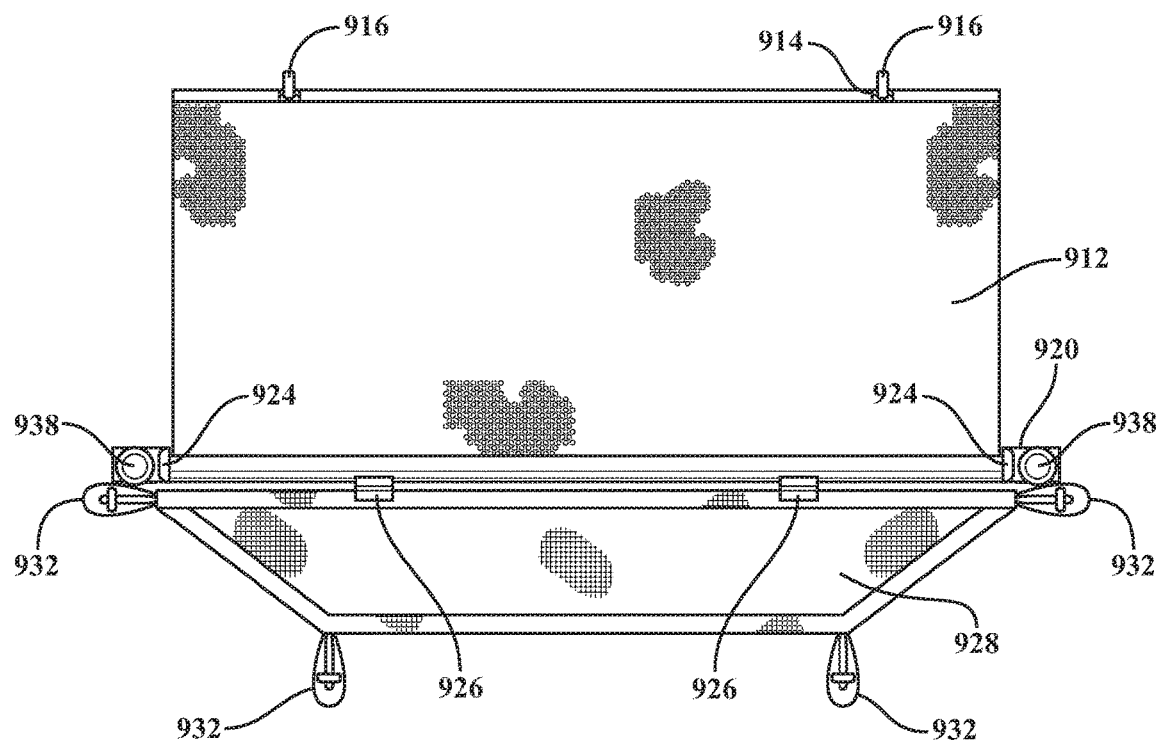
FIG. 21 is a top view of the dual panel with attachments, according to the present invention.
Figure 22:
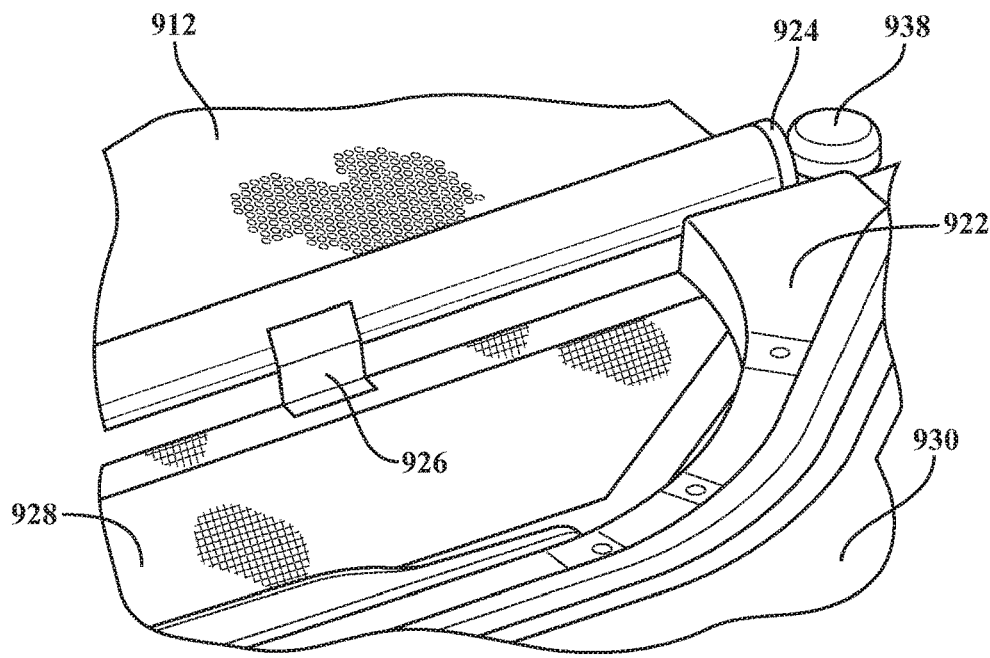
FIG. 22 is a top perspective view of the rear panel deployed in the direction toward the hardtop roof portion and the front panel deployed in the direction toward a windshield header of the vehicle, according to the present invention.
Figure 23:
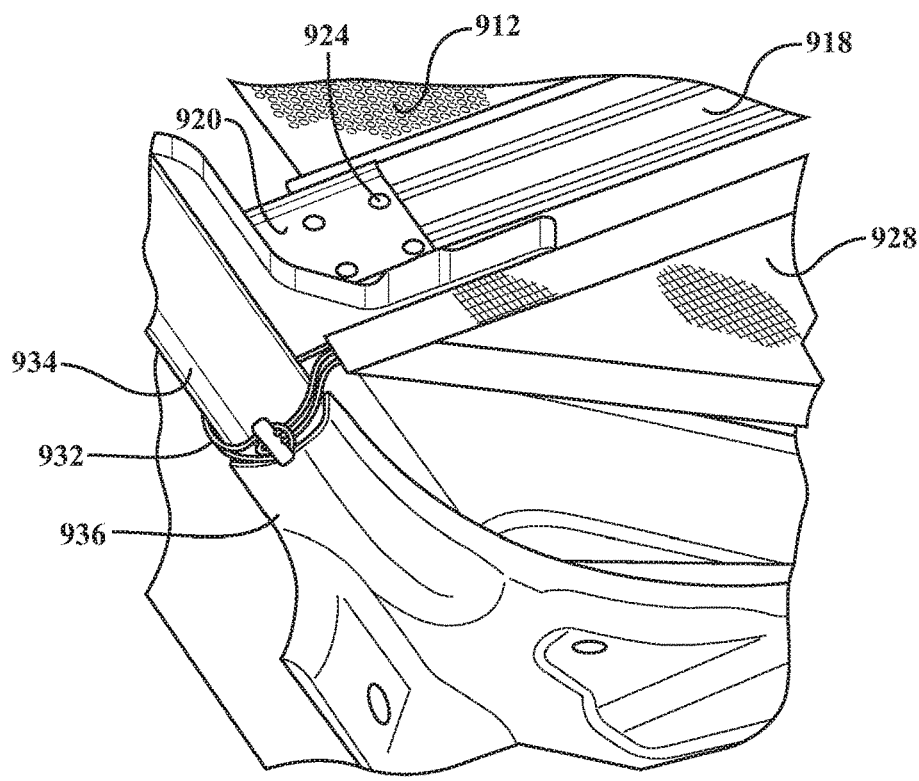
FIG. 23 is a bottom rear perspective view with the rear panel attached to the vehicle, according to the present invention.
Figure 24:
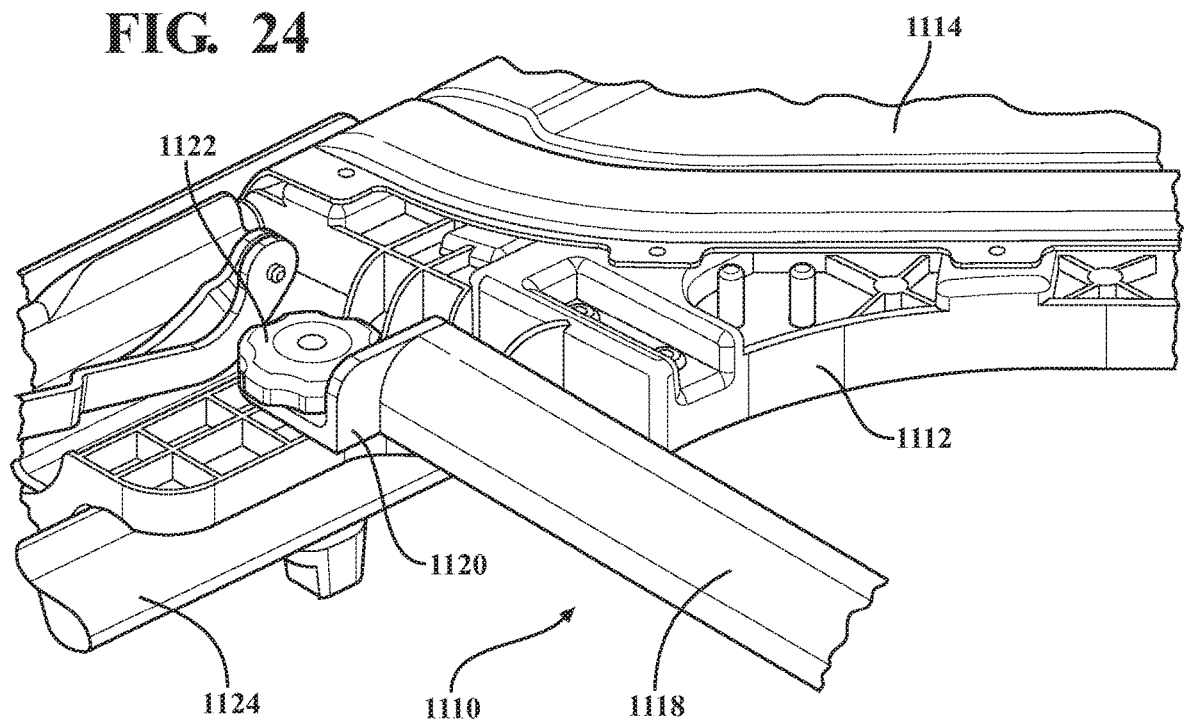
FIG. 24 is a rear perspective view of a retractable overhead cover assembly attached to a rear header of a hardtop roof portion, in accordance with another embodiment of the present invention.
Figure 25:
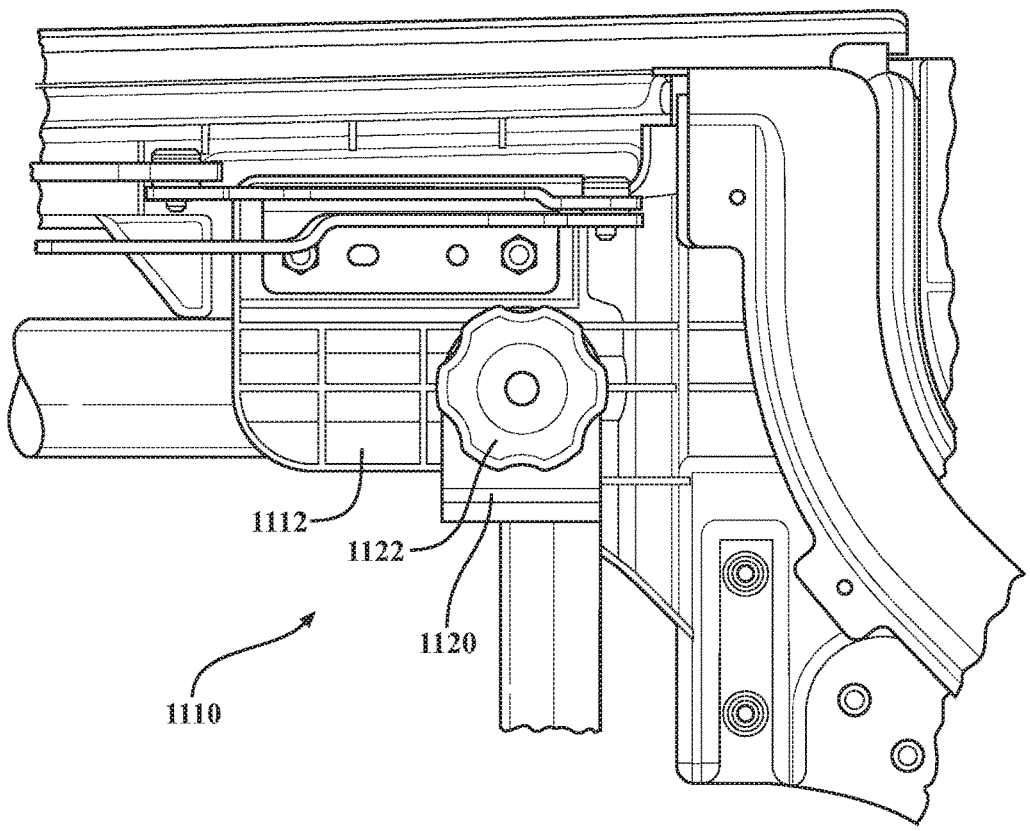
FIG. 25 is a top plan view of the retractable overhead cover assembly of FIG. 24, according to the present invention.

FIG. 19 is a top view of a retractable overhead cover assembly shown generally at 1010 with a retractable panel (e.g., front shade over front cockpit), in accordance with another embodiment of the present invention. The assembly 1010 is used on a 2-door or 4-door soft top SUV, however, other vehicles are contemplated without departing from the scope of the present invention. The shade 912, rod 914, attachment features 914, end caps 924 and housing 918 are identical to the assembly 910 for a hard top vehicle. However, a bracket 1014 is provided that operably connects each end of the housing 918 to the vehicle. Most preferably, the brackets 1014 connect the housing 918 to a door rail 1016 with at least one fastener 101 (e.g., mushroom knob). Alternatively, the bracket 1014 is operably connected to the sport bar 1020.

Referring now to FIGS. 24-27 generally, a retractable overhead cover assembly is shown generally at 1110 with at least one retractable shade (e.g., front shade over front cockpit), in accordance with another embodiment of the present invention. The assembly 1010 is used on a 2-door or 4-door hard top SUV, however, other vehicles are contemplated without departure from the scope of the present invention.

The assembly 1110 is attached to a rear header 1112 provided for a hardtop roof portion 1114. The assembly 1110 includes a housing 1118 with a mounting portion 1120 at each end of the housing 1118. The mounting portion 1120 can be a molded insert or sheet metal part operably attached to the housing 1118. The mounting portion 1120 is connected to the vehicle, preferably, to a rear header 1112 with at least one fastener 1122, most preferably, a mushroom knob. Preferably, the mushroom knob includes a threaded portion extending though the mounting portion 1120, rear header 1112 and sport bar 1124.

The assembly 1110 includes the at least one first retractable shade, such as any of those shades previously described or shown in the previous figures (e.g., 14, FIG. 2, 112a, and etc) and respective tensioning/retracting devices and windshield header attachments and etc, moveable between at least the deployed position attached to the windshield header and the retracted stowed position substantially within the housing. In a particularly preferred embodiment, the assembly 1110 also includes at least one second shade 1116 (e.g., rearward shade). The area rearward of the housing 1118 is covered by the second shade 1116. The second shade 1116 is a fixed shade or a retractable shade, depending on the application. The second shade 1116 is preferably fabric, mesh, or other suitable diffusion material. The second shade 1116 is operably connected to and uses the same housing 1118 as the first shade. The second shade 1116 also has at least one opening placed toward the center rear shade 1116 corresponding to both hard roof panels to allow customer operation of the panel latches.

Figure 26:
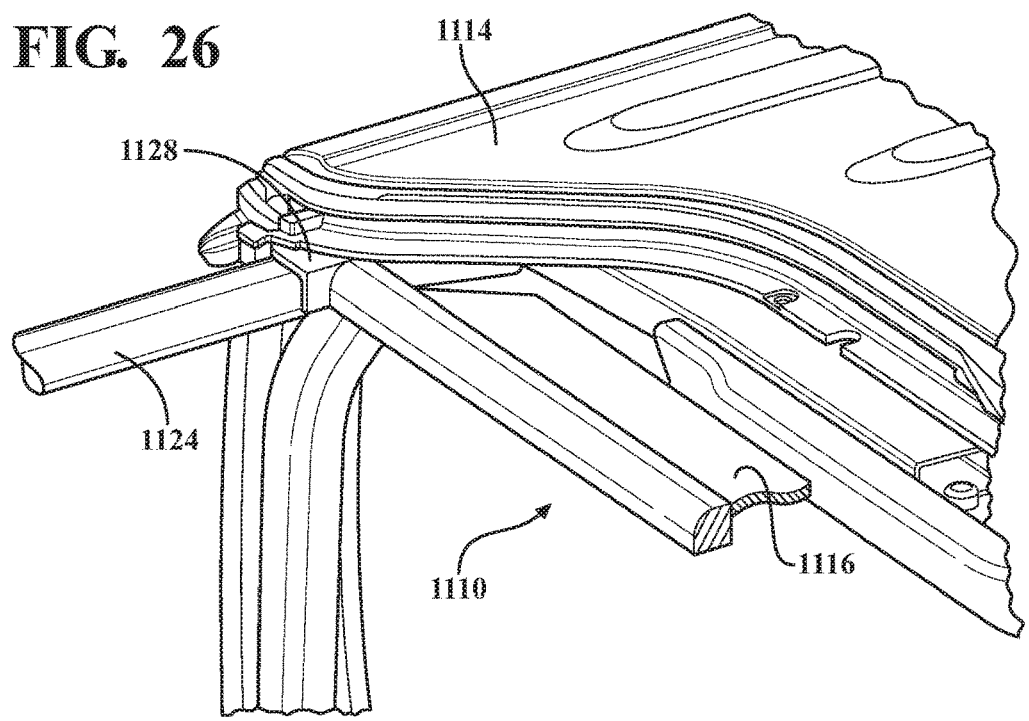
FIG. 26 is a rear perspective view of a retractable overhead cover assembly attached to a support bar, in accordance with another embodiment of the present invention.
Figure 27:
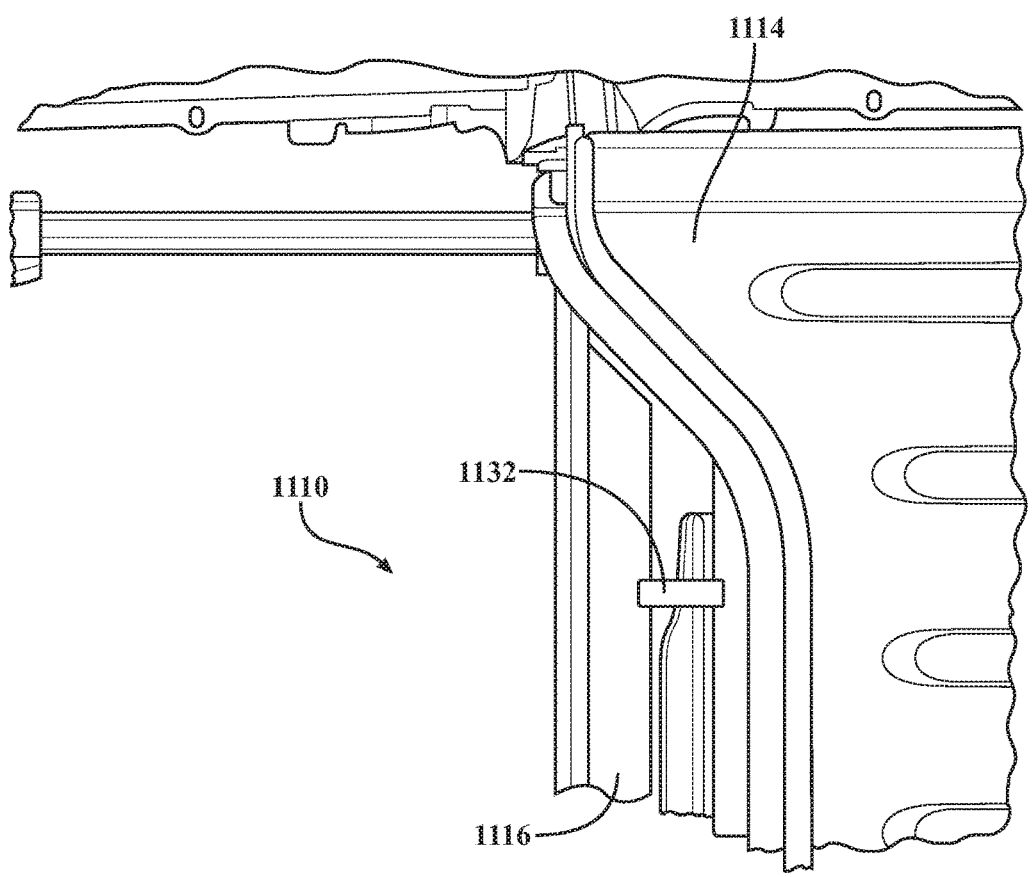
FIG. 27 is a top plan view of the retractable overhead cover assembly of FIG. 26, including a fastener to connect a rear panel to a cross car support bar near a hardtop roof portion, according to the present invention.

Referring now to FIGS. 26-27 generally, an alternative mounting portion 1128 for the assembly 1110 is depicted operable for attachment directly to the sport bar 1124 by at least one fastener 1130 to the sport bar 1124. The mounting portion 1128 is operably attached to the housing 1118 or integrally formed therewith. Preferably, the mounting portion 1128 has a surface that rests on top of the sport bar 1124, has a lower depending portion operably connected to the housing 1118, and is attached to the sport bar 1124 with the at least one fastener 1130, e.g., bolt and nut or other fastener suitable to attach to the sport bar 1124. Thus, the mounting portion 1128 is generally L-shaped. However, other cross sections are contemplated depending on the application, such as U-shaped fitting to the sport bar 1124 (e.g., to clamp the bar), without departure from the scope of the present invention. Optionally, a sheet metal bracket 1132 is provided that attaches the mounting portion 1128 to the knob slot on the sport bar 1124 with at least one fastener, e.g., mushroom knob (see FIG. 28).

FIG. 27 is a top plan view of the retractable overhead cover assembly 1110 of FIG. 26, however, incorporating the sheet metal bracket 1132. The bracket 1132 connects to the sport bar 1124, such as depicted in FIGS. 28).

To cover the area behind the shade housing 1118, the front end of the second shade 1116 (e.g., made of a vinyl cover or shade material) is operably attached to the rear side of the shade extrusion housing 1118. The rear end of the second shade 1116 operably attaches to the cross car support bar 1134 with a plurality of fasteners 1132, e.g., web straps.

Figure 28:
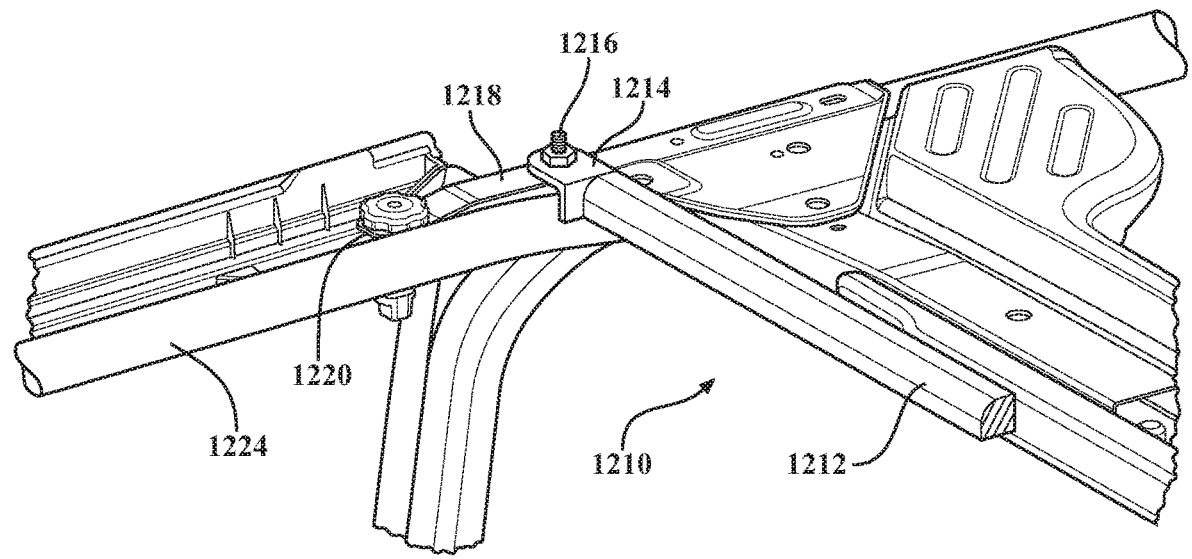
FIG. 28 is a rear perspective view of a retractable overhead cover assembly for a 2 door or 4 door soft top, in accordance with another embodiment of the present invention; and, FIG. 29 is a top plan view of FIG. 28.
Figure 29:
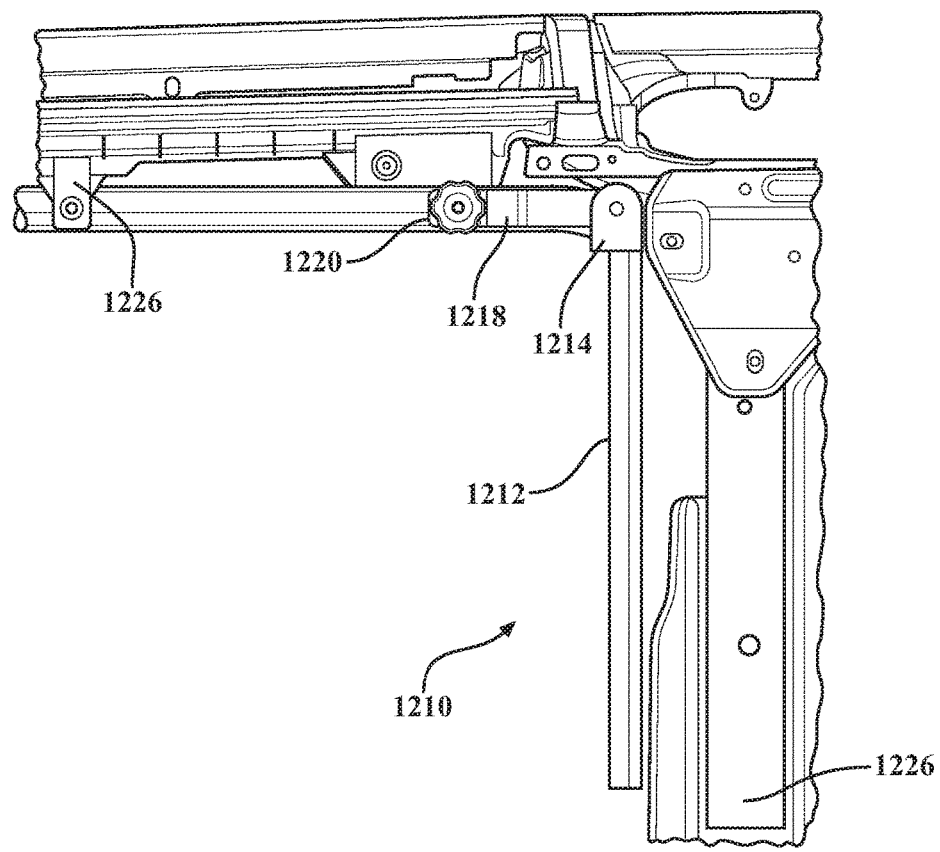

Referring to FIGS. 28-29 generally, there is depicted a retractable overhead cover assembly shown generally at 1210, in accordance with another embodiment of the present invention. The assembly 1210 is used on a 2-door or 4-door soft top SUV, however, the assembly is adaptable for use on other vehicles, e.g., hard tops, without departure from the scope of the present invention. The retractable overhead cover assembly 1210 includes at least one retractable shade (e.g., front shade over front cockpit), such as any of those shades previously described or shown in the previous figures (e.g., 14, FIG. 2, 112a, and etc) and respective tensioning/retracting devices and windshield header attachments and etc, moveable between at least the deployed position attached to the windshield header and the retracted stowed position substantially within the housing. Optionally, a second shade is provided, such as any previously described or shown shade (e.g., 1116, and etc).

The assembly 1210 includes a housing 1212 with a mounting portion 1214 at each end of the housing 1212, similar to the housing 1118 and mounting portion 1128. The mounting portion 1214 has at least one aperture 1216. Depending on the application, at least one fastener 1218, e.g., a nut and bolt, through the aperture 1216 connects the mounting portion 1214 to the sport bar 1224. This is particularly preferred on a 4-door hard top SUV. Alternatively, the mounting portion 1214 is connected to a bracket 1218, e.g., sheet metal bracket, with the at least one fastener 1218. The bracket 1218 extends in a generally forward and is operably connected to the sport bar 1224 with at least one fastener 1220, a mushroom knob. Preferably, the mushroom knob includes a threaded portion extending though the bracket 1220 and sport bar 1224. A door rail 1226 can also be provided, depending on the application. Optionally, the mushroom knob fastener 1220 also extends through the door rail.

By way of non-limiting example, the shade may be around 20 millimeters lower on a 4-door vehicle than a 2-door vehicle, depending on the application.

Referring to the figures generally, seals are also contemplated suitable for further diffusion such as in areas with gaps or openings, e.g., bulb seal(s), overlap seal(s), foam, cross-linked foam, flanged, etc., according to any embodiment of the present invention.

The embodiments are adaptable for use with 2-door, 4-door, extended bed, hard top, or soft top, SUVs or any other vehicle without departing from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A retractable overhead cover assembly for a sport utility vehicle, comprising:
    at least one retractable shade moveable between at least a deployed position and a stowed position, said deployed position covers at least the front cockpit and/or rear cockpit of the vehicle;
    at least one attachment rod coupled to material of the retractable shade and operably attachable to the vehicle to hold the retractable shade in the deployed position when desired;
    at least one housing coupled to the retractable shade, said retractable shade is retracted into the housing when the retractable shade is in the stowed position;
    at least one tensioning mechanism operable to allow retractable shade material management and automatic retraction of the retractable shade when desired; and
    a mounting portion on both ends of the housing operably connected to opposing sport bars of the vehicle in a cross-car direction by at least one fastener.

2. The retractable overhead cover assembly of claim 1, wherein the retractable shade is spring loaded and tension is held on the retractable shade by the tensioning mechanism to aid in material management and top retraction when the retractable shade needs to be stowed.

3. The retractable overhead cover assembly of claim 1, wherein the attachment rod of the retractable shade is a stiffening rod along one end of the retractable shade, said stiffening rod including at least one attachment feature that operably connects to at least one attachment point, respectively, located on the vehicle.

4. The retractable overhead cover assembly of claim 3, wherein there are a plurality of the attachment features shaped as hooks to operably connect to a plurality of footman loops on the windshield header area of the vehicle.

5. The retractable overhead cover assembly of claim 1, wherein the vehicle is selected from the group consisting of a two-door sport utility vehicle (SUV) with a removable hard top system, four-door SUV with a removable hard top system, two-door SUV with a removable or foldable/stowable soft top system, four-door SUV with a removable or foldable/stowable soft top system, a 2-door SUV with a removable or foldable/stowable front soft top portion and a rear hard top portion, and a 4-door with a removable or foldable/stowable front soft top portion and a rear hard top portion.

6. The retractable overhead cover assembly of claim 5, wherein the housing is an aluminum extrusion, and the tensioning mechanism and retractable shade system is largely contained within the aluminum extrusion to provide a retractable shade unit that is small and compact enough to be left connected to the vehicle without interference with a vehicle hard top roof system or soft top roof system.

7. The retractable overhead cover assembly of claim 1, wherein the material of the retractable shade is selected from the group consisting of woven mesh, knitted mesh, welded mesh, fabric, and combinations thereof.

8. The retractable overhead cover assembly of claim 1, wherein the assembly is a single shade unit with a single retractable shade, where the assembly is operably mounted to opposing vehicle sport bars in a cross-car position so that the retractable shade pulled from the housing to the deployed position covers the front cockpit or rear cockpit.

9. A retractable overhead cover assembly for a sport utility vehicle, comprising:
    at least one retractable shade moveable between at least a deployed position and a stowed position, said deployed position covers at least the front cockpit and/or rear cockpit of the vehicle;
    at least one attachment rod coupled to material of the retractable shade and operably attachable to the vehicle to hold the retractable shade in the deployed position when desired;

at least one housing coupled to the retractable shade, said retractable shade is retracted into the housing when the retractable shade is in the stowed position;

at least one tensioning mechanism operable to allow retractable shade material management and automatic retraction of the retractable shade when desired, wherein the assembly is a dual shade unit, wherein, with the housing operably mounted in a cross-car position to opposing vehicle sport bars with at least one fastener toward both ends of the housing, the retractable shade covers the front cockpit when deployed, and, a second shade connected on the other side of the housing covers an area behind the housing when deployed.

10. The retractable overhead cover assembly of claim 9, wherein the second shade is connected to opposing sport bars and a cross-car member by a plurality of elastic fasteners or webbing straps.

11. The retractable overhead cover assembly of claim 9, wherein the second shade is operably connected to the housing with a plurality of hook and loop fasteners.

12. A retractable overhead cover assembly for a sport utility vehicle, comprising:
   at least one retractable shade moveable between at least a deployed position and a stowed position, said deployed position covers at least the front cockpit and/or rear cockpit of the vehicle;
   at least one attachment rod coupled to material of the retractable shade and operably attachable to the vehicle to hold the retractable shade in the deployed position when desired;
   at least one housing coupled to the retractable shade, said retractable shade is retracted into the housing when the retractable shade is in the stowed position;
   at least one tensioning mechanism operable to allow retractable shade material management and automatic retraction of the retractable shade when desired; and
   a second shade operably connected to the housing and extending rearward, wherein the second shade is connected to a cross-car member of the vehicle with a plurality of fasteners.

13. The retractable overhead cover assembly of claim 12, wherein the fasteners are web straps or elastic robs.

14. The retractable overhead cover assembly of claim 1, wherein the mounting portions rest directly on top of the opposing sports bars, respectively, and, wherein the fastener is a nut and bolt to connect each mounting portion directly to the opposing sport bars.

15. The retractable overhead cover assembly of claim 1, wherein the at least one fastener is a mushroom knob, each mushroom knob connecting the sport bar to the mounting portion with a rear header of a hard top portion sandwiched therebetween.

16. The retractable overhead cover assembly of claim 1, further comprising a bracket operably connected to the mounting portions, wherein said bracket is connected to the opposing sport bars by at least one mushroom knob fastener.

17. The retractable overhead cover assembly of claim 1, wherein the assembly is a dual shade unit with at least two retractable shades, where the assembly is mounted in a cross-car position so that the retractable shades independently cover the front and rear cockpits, or, the assembly is centrally mounted in a fore-aft direction so that the retractable shades independently cover the left or right side of the front or rear cockpits.

18. A retractable overhead cover assembly for a 2-door or 4-door sport utility vehicle, comprising:
   at least one retractable shade, each retractable shade moveable between at least a deployed position and a stowed position, respectively;
   at least one housing coupled to the retractable shade, said housing having an opening to receive the retractable shade as the at least one retractable shade is retracted into the housing to the stowed position leaving only a portion of the retractable shade exposed for gripping to move to the shade to the deployed position;
   at least one tensioning mechanism operable to tension and retract the retractable shade when desired; and
   a pair of mounting portions operably connected toward both ends of the housing, wherein at least one fastener operably connected the mounting portions to opposing sport bars of the vehicle.

19. A retractable overhead cover assembly for a 2-door or 4-door sport utility vehicle, comprising:
   at least one retractable shade moveable between at least a deployed position and a stowed position;
   at least one housing coupled to the retractable shade to tension the retractable shade and retain the retractable shade in the stowed position;
   optionally, at least one second shade operably coupled to the housing and extending rearward to cover a gap rearward of the housing between the housing and a cross-car member;
   at least one tensioning mechanism operable to retract the retractable shade into the stowed position relative to the housing; and
   a pair of mounting portions operably connected toward both ends of the housing to operably connect the housing to opposing sport bars of the vehicle with a plurality of fasteners.

* * * * *